(12) United States Patent
Iizuka et al.

(10) Patent No.: US 10,009,151 B2
(45) Date of Patent: Jun. 26, 2018

(54) PACKET STORAGE METHOD, INFORMATION PROCESSING APPARATUS, AND NON-TRANSITORY COMPUTER-READABLE STORAGE MEDIUM

(71) Applicant: FUJITSU LIMITED, Kawasaki-shi, Kanagawa (JP)

(72) Inventors: Fumiyuki Iizuka, Kawasaki (JP); Yuji Nomura, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 172 days.

(21) Appl. No.: 14/531,086

(22) Filed: Nov. 3, 2014

(65) Prior Publication Data
US 2015/0172225 A1  Jun. 18, 2015

(30) Foreign Application Priority Data
Dec. 12, 2013  (JP) .................................. 2013-257484

(51) Int. Cl.
*H04L 1/20* (2006.01)
*H04L 12/26* (2006.01)
*H04L 12/24* (2006.01)

(52) U.S. Cl.
CPC .............. *H04L 1/201* (2013.01); *H04L 41/14* (2013.01); *H04L 43/0823* (2013.01)

(58) Field of Classification Search
CPC ...... H04L 1/201; H04L 41/14; H04L 43/0823
See application file for complete search history.

(56) References Cited

U.S. PATENT DOCUMENTS

| 5,572,533 A | * | 11/1996 | Sunada | H04L 12/46 370/245 |
| 7,610,359 B2 | * | 10/2009 | Yoon | G11B 27/105 386/248 |
| 8,132,089 B1 | * | 3/2012 | Blair | H04L 43/026 714/811 |
| 8,509,072 B2 | * | 8/2013 | Lee | H04L 43/028 370/230 |

(Continued)

FOREIGN PATENT DOCUMENTS

| JP | 2008-060672 | 3/2008 |
| JP | 2008-079028 | 4/2008 |

(Continued)

OTHER PUBLICATIONS

Office Action in Japanese Patent Application No. 2013-257484 dated Aug. 8, 2017 with machine generated English translation, 5 pages.

*Primary Examiner* — Sulaiman Nooristany
(74) *Attorney, Agent, or Firm* — Oblon, McClelland, Maier & Neustadt, L.L.P.

(57) ABSTRACT

A packet storage method includes receiving a plurality of packets from a network including a plurality of connections, associating, with each of the packet, a connection via which the corresponding packet has passed, specifying a connection, among the plurality of connections, in which an error has occurred, based on analysis of the plurality of packets, identifying the packet which has passed through the connection in which the error has occurred, and storing, in a storage device, the identified packet, among the plurality of received packets.

20 Claims, 38 Drawing Sheets

(56) References Cited

U.S. PATENT DOCUMENTS

| | | | | |
|---|---|---|---|---|
| 8,854,980 | B2* | 10/2014 | Letner | H04L 49/357 370/241 |
| 2009/0097425 | A1* | 4/2009 | Sammour | H04L 1/1841 370/310 |
| 2011/0128853 | A1* | 6/2011 | Nishimura | H04L 47/10 370/235 |
| 2013/0007823 | A1* | 1/2013 | Mangs | H04L 1/0061 725/109 |
| 2013/0229925 | A1* | 9/2013 | Kitada | H04L 43/08 370/246 |
| 2014/0269276 | A1* | 9/2014 | Rothstein | H04L 43/0894 370/230 |

FOREIGN PATENT DOCUMENTS

| | | |
|---|---|---|
| JP | 2008-205954 | 9/2008 |
| JP | 2010-178299 | 8/2010 |

* cited by examiner

FIG. 2

| CONNECTION ID | TRANSMISSION SOURCE IP ADDRESS | TRANSMISSION SOURCE IP PORT NUMBER | TRANSMISSION DESTINATION IP ADDRESS | TRANSMISSION DESTINATION PORT NUMBER | PROTOCOL NUMBER |
|---|---|---|---|---|---|
| CN-0001 | 10.20.30.40 | 2000 | 10.20.30.50 | 20 | 6 |
| CN-0002 | 20.30.40.50 | 3000 | 10.20.30.60 | 80 | 6 |
| CN-0003 | 30.40.50.60 | 4000 | 40.50.60.70 | 3000 | 17 |
| ... | ... | ... | ... | ... | ... |

| CYCLE NUMBER | START RECORD NUMBER | END RECORD NUMBER |
|---|---|---|
| 1 | 1 | 6 |

| PACKET ID | CONNECTION ID |
|---|---|
| PC-000001 | CN-0001 |
| PC-000002 | CN-0002 |
| PC-000003 | CN-0002 |
| PC-000004 | CN-0003 |
| PC-000005 | CN-0003 |
| PC-000006 | CN-0001 |
| UNSET | UNSET |
| ⋮ | ⋮ |

INDEX BUFFER

FIG. 4

| CYCLE NUMBER | START RECORD NUMBER | END RECORD NUMBER |
|---|---|---|
| 2 | 100001 | 100003 |

| PACKET ID | CONNECTION ID |
|---|---|
| PC-000001 | CN-0001 |
| PC-000002 | CN-0002 |
| PC-000003 | CN-0002 |
| ⋮ | ⋮ |
| PC-100001 | CN-0003 |
| PC-100002 | CN-0002 |
| PC-100003 | CN-0004 |
| UNSET | UNSET |
| ⋮ | ⋮ |

INDEX BUFFER

FIG. 5

| CONNECTION ID OF "LOSS INCREASE" | ERROR REMOVAL TIMING |
|---|---|
| CN-0001 | UNSET |
| CN-0004 | UNSET |
| UNSET | UNSET |
| ⋮ | ⋮ |

FIG. 6

| CONNECTION ID OF "RTT INCREASE" | ERROR REMOVAL TIMING |
|---|---|
| CN-0003 | UNSET |
| UNSET | UNSET |
| ⋮ | ⋮ |

FIG. 7

| CONNECTION ID OF "SERVER DELAY INCREASE" | ERROR REMOVAL TIMING |
|---|---|
| UNSET | UNSET |
| UNSET | UNSET |
| ⋮ | ⋮ |

FIG. 13

| CONNECTION ID OF "LOSS INCREASE" | ERROR REMOVAL TIMING |
|---|---|
| CN-0001 | 10 |
| CN-0004 | UNSET |
| UNSET | UNSET |
| ⋮ | ⋮ |

FIG. 15

| CYCLE NUMBER | 1 | RETENTION FLAG | OFF |
|---|---|---|---|
| PACKET ID | | CONNECTION ID | |
| PC-000001 | | CN-0001 | |
| PC-000002 | | CN-0002 | |
| PC-000003 | | CN-0002 | |
| ... | | ... | |

1501a

| CYCLE NUMBER | 2 | RETENTION FLAG | OFF |
|---|---|---|---|
| PACKET ID | | CONNECTION ID | |
| PC-200001 | | CN-0003 | |
| PC-200002 | | CN-0002 | |
| PC-200003 | | CN-0004 | |
| ... | | ... | |

1501b

| CYCLE NUMBER | 3 | RETENTION FLAG | OFF |
|---|---|---|---|
| PACKET ID | | CONNECTION ID | |
| PC-200011 | | CN-0003 | |
| PC-200012 | | CN-0002 | |
| PC-200013 | | CN-0004 | |
| ... | | ... | |

1501c

1403

INDEX TABLE STORAGE SECTION

FIG. 19

| | CONNECTION ID | TRANSMISSION SOURCE IP ADDRESS | TRANSMISSION SOURCE IP PORT NUMBER | TRANSMISSION DESTINATION IP ADDRESS | TRANSMISSION DESTINATION PORT NUMBER | PROTOCOL NUMBER |
|---|---|---|---|---|---|---|
| HEADER PORTION | CN-0001 | 10.20.30.40 | 2000 | 10.20.30.50 | 20 | 6 |
| TABLE PORTION | PACKET ID | | | | OFFSET | |
| | PC-000001 | | | | 0 | |
| | PC-000006 | | | | 624 | |
| | ... | | | | ... | |

FIG. 20

| HEADER PORTION | ERROR TYPE |  |
|---|---|---|
|  | LOSS INCREASE |  |
| TABLE PORTION | CONNECTION ID | START OFFSET |
|  | CN-0001 | 0 |
|  | CN-0004 | 62004 |

FIG. 28

| RECORD TIME | ... | 10:00:00 | 10:00:30 | 10:01:00 | ... |
|---|---|---|---|---|---|
| WRITE AMOUNT (G BYTE) | ... | 0.626 | 2.534 | 1.245 | ... |
| WRITE TIME (SECOND) | ... | 6 | 24 | 12 | ... |
| STORAGE REMAINING AMOUNT (G BYTE) | ... | 6002 | 5999 | 5998 | ... |

FIG. 33

|  | LOSS INCREASE | RTT INCREASE | SERVER DELAY INCREASE |
|---|---|---|---|
| FIRST POLICY | RETAIN | RETAIN | RETAIN |
| SECOND POLICY | RETAIN | RETAIN | NOT RETAIN |
| THIRD POLICY | RETAIN | NOT RETAIN | NOT RETAIN |

FIG. 34

| CYCLE NUMBER | NUMBER OF RECORDS | | CYCLE NUMBER | NUMBER OF RECORDS |
|---|---|---|---|---|
| 1 | 100000 | | 2 | 3 |
| PACKET ID | CONNECTION ID | | PACKET ID | CONNECTION ID |
| PC-000001 | CN-0001 | | PC-200001 | CN-0003 |
| PC-000002 | CN-0002 | | PC-200002 | CN-0002 |
| PC-000003 | CN-0002 | | PC-200003 | CN-0004 |
| PC-000004 | CN-0003 | | UNSET | UNSET |
| PC-000005 | CN-0003 | | ⋮ | ⋮ |
| PC-000006 | CN-0001 | | | |
| ⋮ | ⋮ | | | |

INDEX BUFFER

PACKET STORAGE METHOD, INFORMATION PROCESSING APPARATUS, AND NON-TRANSITORY COMPUTER-READABLE STORAGE MEDIUM

CROSS-REFERENCE TO RELATED APPLICATION

This application is based upon and claims the benefit of priority of the prior Japanese Patent Application No. 2013-257484, filed on Dec. 12, 2013, the entire contents of which are incorporated herein by reference.

FIELD

The embodiments discussed herein are related to a technique for retaining a protocol data unit (PDU) captured from a network.

BACKGROUND

For example, there is a network monitoring apparatus that captures a packet that passes, for example, a switch by mirroring to monitor the state of a network.

Specifically, in addition to a method in which sequenced packets are analyzed and statistical processing for the number of packet losses, round trip time (RTT), and the like is performed based on an analysis result to thereby promptly analyze the state of a connection, there is a method in which captured packets are accumulated and the state of connection is retroactively analyzed.

When an error occurs in a connection, without accumulated packets relating to the connection, the contents of the error are not retroactively analyzed. However, if packets relating to connections are accumulated in order to enable retroactive analysis for any of the connections, the storage capacity that is to be provided is increased. Japanese Laid-open Patent Publication No. 2010-178299 and Japanese Laid-open Patent Publication No. 2008-060672 discuss related art.

SUMMARY

According to an aspect of the invention, a packet storage method includes receiving a plurality of packets from a network including a plurality of connections, associating, with each of the packet, a connection via which the corresponding packet has passed, specifying a connection, among the plurality of connections, in which an error has occurred, based on analysis of the plurality of packets, identifying the packet which has passed through the connection in which the error has occurred, and storing, in a storage device, the identified packet, among the plurality of received packets.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 2 is a table illustrating an example of a connection table;

FIG. 3 is a diagram illustrating an example of an index buffer;

FIG. 4 is a diagram illustrating an example of the index buffer;

FIG. 5 is a table illustrating an example of an error table for "loss increase";

FIG. 6 is a table illustrating an example of an error table for "RTT increase";

FIG. 7 is a table illustrating an example of an error table for "server delay increase";

FIG. 13 is a table illustrating an example of the error table for "loss increase";

FIG. 15 is a diagram illustrating an example index table storage section;

FIG. 19 is a table illustrating an example of metadata;

FIG. 20 is a table illustrating an example of higher-order metadata;

FIG. 28 is a table illustrating an example of aggregate data;

FIG. 33 is a table illustrating an example of policy data;

FIG. 34 is a diagram illustrating an example of an index buffer according to a third embodiment;

DESCRIPTION OF EMBODIMENTS

First Embodiment

Figure 1:
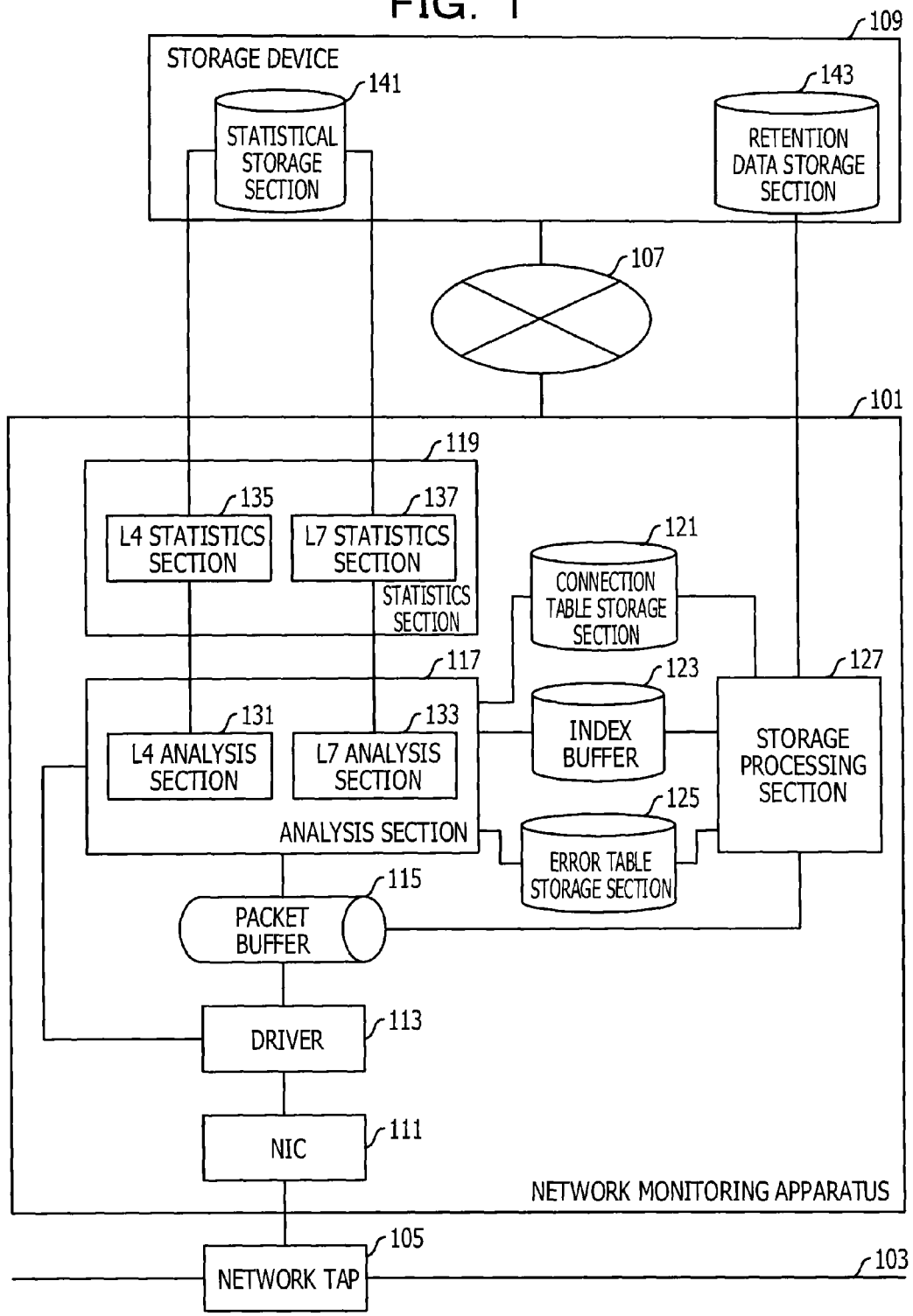
FIG. 1 is a diagram illustrating an example configuration of a network monitoring system.

FIG. 1 is a diagram illustrating an example configuration of a network monitoring system. A network monitoring apparatus 101 is coupled to a monitoring target network 103 via a network tap 105. The monitoring target network 103 is, for example, a local area network (LAN). The network monitoring apparatus 101 captures packets transmitted through the monitoring target network 103. For example, the network monitoring apparatus 101 reproduces packets passing a switch of the monitoring target network 103 in a mirror port to capture them. As another alternative, the network monitoring apparatus 101 may be configured to capture the packets using a tap. Note that a packet is an example of PDU.

The network monitoring apparatus 101 includes a network interface card (NIC) 111, a driver 113, a packet buffer 115, an analysis section 117, a statistics section 119, a connection table storage section 121, an index buffer 123, an error table storage section 125, and a storage processing section 127.

The NIC 111 is an interface card used for coupling to a network. The driver 113 extracts packets, stores the extracted packets in the packet buffer 115, and allocates an ID to each of the extracted packets. The packet buffer 115 stores packets.

The analysis section 117 mainly analyzes packets, identifies a connection in which an error has occurred, and generates index records used for sorting packets for each connection. By providing the index records, the load of processing of collecting packets is reduced. The analysis section 117 includes an L4 analysis section 131 and an L7 analysis section 133. The L4 analysis section 131 performs analysis relating to a fourth layer (which will be hereinafter referred to as L4) in an open systems interconnection (OSI) reference model of International Organization for Standardization (IOS). The L7 analysis section 133 performs analysis relating to a seventh layer (which will be hereinafter referred to as L7) in the OSI reference model of IOS.

The statistics section 119 performs statistical processing based on an analysis result. The statistics section 119 includes an L4 statistics section 135 and an L7 statistics section 137. The L4 statistics section 135 performs statistical processing relating to L4. Specifically, the L4 statistics section 135 diagnoses a network state substantially on a real-time basis based on statistical analysis information, such as the number of transmitted and received packets, the byte count, the number of packet losses, RTT, and the like. The L7 statistics section 137 performs statistical processing relating to L7.

The connection table storage section 121 stores a connection table relating to connections extracted from packets. The index buffer 123 stores index records each of which associates a packet and a connection with one another. Note that, in this embodiment, an example in which index records are managed in a ring buffer format will be described. In another embodiment that will be described later, an example in which index records are managed in a two-buffer table format will be described. The error table storage unit 125 stores an error table used for identifying a connection in which an error has occurred. In this embodiment, an example in which an error table is provided for each error type will be described, but the error table may be configured to manage a plurality of error types together.

The network monitoring apparatus 101 is coupled to a storage device 109 via a transmission network 107. The storage device 109 includes a statistical storage section 141 and a retention data storage section 143. The statistical storage section 141 stores results of statistical processing in the statistics section 119. The retention data storage section 143 stores retention data transmitted from the network monitoring apparatus 101. The transmission network 107 may be the same network as the monitoring target network 103.

Figure 38:
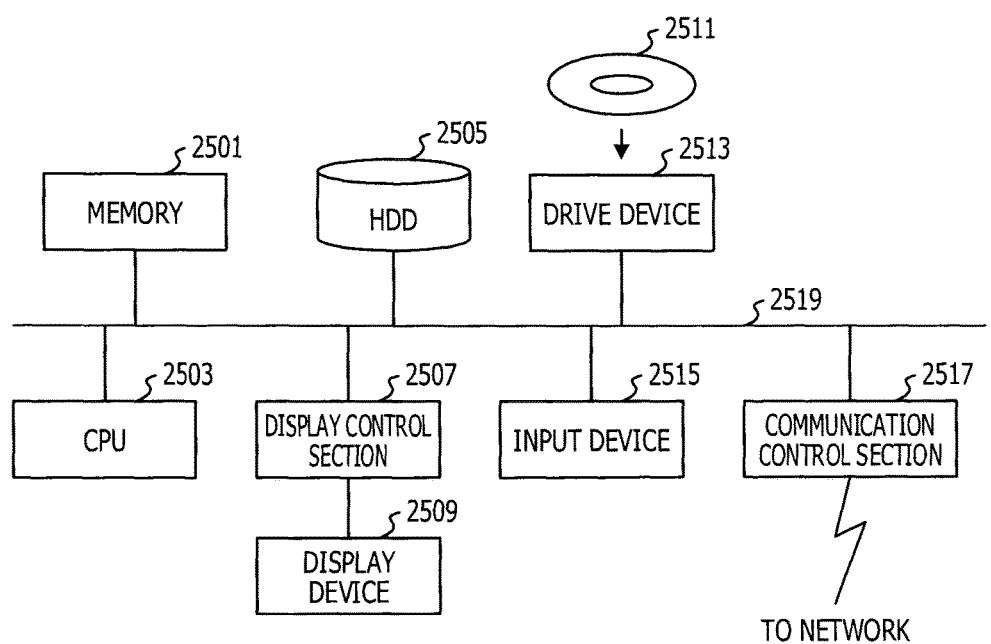
FIG. 38 is a diagram illustrating a hardware configuration of a computer.

The driver 113, the packet buffer 115, the analysis section 117, the statistics section 119, the connection table storage section 121, the index buffer 123, the error table storage section 125, the storage processing section 127, the L4 analysis section 131, the L7 analysis section 133, the L4 statistics section 135, and the L7 statistics section 137 are realized, for example, by hardware resources illustrated in FIG. 38. As for the driver 113, the analysis section 117, the statistics section 119, the storage processing section 127, the L4 analysis section 131, the L7 analysis section 133, the L4 statistics section 135, and the L7 statistics section 137, some or all of processes of the corresponding module may be realized by causing a central processing unit (CPU) 2503 (FIG. 38) to sequentially execute programs loaded to a memory 2501 (FIG. 38). The description of the configuration of the network monitoring system is ended here.

Next, the connection table stored in the connection table storage section 121 will be described. FIG. 2 is a table illustrating an example of the connection table. In the connection table, data that defines a connection is set for each connection.

The connection table includes a record for each connection. The record includes a field used for setting a connection ID, a field used for setting a transmission source internet protocol (IP) address, a field used for setting a transmission source port number, a field used for setting a transmission destination IP address, a field used for setting a transmission destination port number, and a field used for setting a protocol number.

The connection ID is an identifier that the analysis section 117 allocates in order to identify a connection. The transmission source IP address is the IP address of a host apparatus serving as a transmission source of the corresponding packet. The transmission source port number is the number of a port that transmits the corresponding packet in the host apparatus serving as the transmission source of the corresponding packet. The transmission destination IP address is the IP address of a host apparatus corresponding to the transmission destination of the corresponding packet. The transmission destination port number is the number of a port that receives the corresponding packet in the host apparatus corresponding to the transmission destination of the corresponding packet. The protocol number is a number that identifies the protocol of the fourth layer in the OSI reference model of ISO. The protocol number "6" represents a transmission control protocol (TCP) and the protocol number "17" represents a user datagram protocol (UDP).

A first record in this example indicates that, for the connection to which the connection ID "CN-0001" is allocated, the port number "2000" in a host apparatus having the IP address "10. 20. 30. 40" corresponds to a transmission source and the port number "20" in a host apparatus having the IP address "10. 20. 30. 50" corresponds to a transmission destination. The first record also indicates that the protocol of the fourth layer in this connection is TCP.

A second record in this example indicates that, for a connection to which the connection ID "CN-0002" is allocated, the port number "3000" in a host apparatus having the IP address "20. 30. 40. 50" corresponds to a transmission source and the port number "80" in a host apparatus having the IP address "10. 20. 30. 60" corresponds to a transmission destination. The second record also indicates that the protocol of the fourth layer in this connection is TCP.

A third record in this example indicates that, for a connection to which the connection ID "CN-0003" is allocated, the port number "4000" in a host apparatus having the IP address "30. 40. 50. 60" corresponds to a transmission source and the port number "3000" in a host apparatus having the IP address "40. 50. 60. 70" corresponds to a transmission destination. The third record also indicates that the protocol of the fourth layer in this connection is UDP. The description of the connection table is ended here.

Next, the index buffer 123 will be described. FIG. 3 is a table illustrating an example of the index buffer 123. The index buffer 123 stores a ring buffer 301. The ring buffer 301 includes a header portion. In the header portion, a field used for setting a cycle number, a field used for setting a start record number, and a filed used for setting an end record number are provided. The cycle number is a number that identifies the corresponding cycle. The cycle number is sequentially given. The start record number identifies an initial index record in the corresponding cycle. The end record number identifies a final index record in the corresponding cycle.

The data main body of the ring buffer 301 includes an index record for each packet. The record includes a field used for setting a packet ID and a field used for setting a connection ID. The packet ID is an identifier sequentially given to a captured packet. The connection ID in this example is an example identifier relating to characteristics of the corresponding packet. These index records are managed in a ring shape such that the initial index record follows the final index record.

This example indicates the intermediate state of a first cycle. Index records in a cycle identified by the cycle number "1" start with the first record and have been set up to the sixth record at this time point.

This example indicates that, in the first record, a connection relating to a packet to which the packet ID "PC-000001" is allocated is identified by the connection ID "CN-0001".

Similarly, this example indicates that, in the second record, a connection relating to a packet to which the packet ID "PC-000002" is allocated is identified by the connection ID "CN-0002".

Similarly, this example indicates that, in the third record, a connection relating to a packet to which the packet ID "PC-000003" is allocated is identified by the connection ID "CN-0002".

Similarly, this example indicates that, in the fourth record, a connection relating to a packet to which the packet ID "PC-000004" is allocated is identified by the connection ID "CN-0003".

Similarly, this example indicates that, in the fifth record, a connection relating to a packet to which the packet ID "PC-000005" is allocated is identified by the connection ID "CN-0003".

Similarly, this example indicates that, in the sixth record, a connection relating to a packet to which the packet ID "PC-000006" is allocated is identified by the connection ID "CN-0001".

FIG. 4 is a diagram illustrating the intermediate state of a second cycle. Index records in a cycle identified by the cycle number "2" start with the 100001th record and have been set up to the 100003th record at this time point.

This example indicates that, in the 100001th record, a connection relating to a packet to which the packet ID "PC-100001" is allocated is identified by the connection ID "CN-0003".

Similarly, this example indicates that, in the 100002th record, a connection relating to a packet to which the packet ID "PC-100002" is allocated is identified by the connection ID "CN-0002".

Similarly, this example indicates that, in the 100003th record, a connection relating to a packet to which the packet ID "PC-100003" is allocated is identified by the connection ID "CN-0004". The description of the index buffer 123 is ended here.

Next, the error table stored in the error table storage section 125 will be described. In this example, the error table is provided for each error type. FIG. 5 is a table illustrating an example of an error table for "loss increase". This error table includes a record for each connection in which "loss increase" has occurred. The record includes a field used for setting a connection ID (which will be herein after referred to as a "loss increase" connection ID) for a connection in which "loss increase" has occurred and a field used for setting an error removal timing. In the field used for setting the error removal timing, the cycle number that identifies the timing with which "loss increase" was removed is set.

The first record in this example indicates that "loss increase" has occurred in the connection identified by the connection ID "CN-0001" and the "loss increase" has not been removed yet.

Similarly, the second record in this example indicates that "loss increase" has occurred also in the connection identified by the connection ID "CN-0004" and the "loss increase" has not been removed yet.

FIG. 6 is a table illustrating an example of an error table relating to "RTT increase". This error table includes a record for each connection in which "RTT increase" has occurred. The record includes a field used for setting a connection ID (which will be hereinafter referred to as an "RTT increase" connection ID) for a connection in which "RTT increase" has occurred and a field used for setting an error removal timing. In the field used for setting the error removal timing, the cycle number that identifies the timing with which the "RTT increase" was removed is set.

The first record in this example indicates that "RTT increase" has occurred in the connection identified by the connection ID "CN-0003" and the "RTT increase" has not been removed yet.

FIG. 7 is a table illustrating an example of an error table relating to "server delay increase". This error table includes a record for each connection in which "server delay increase" has occurred. The record includes a field used for setting a connection ID (which will be hereinafter referred to as a "server delay increase" connection ID) for a connection in which "server delay increase" has occurred and a field used for setting an error removal timing. In the field used for setting the error removal timing, the cycle number that identifies the timing with which the "server delay increase" was removed is set. This example indicates that "server delay increase" has not occurred in any connection. The description of the error table stored in the error table storage section 125 is ended here.

Figure 8:
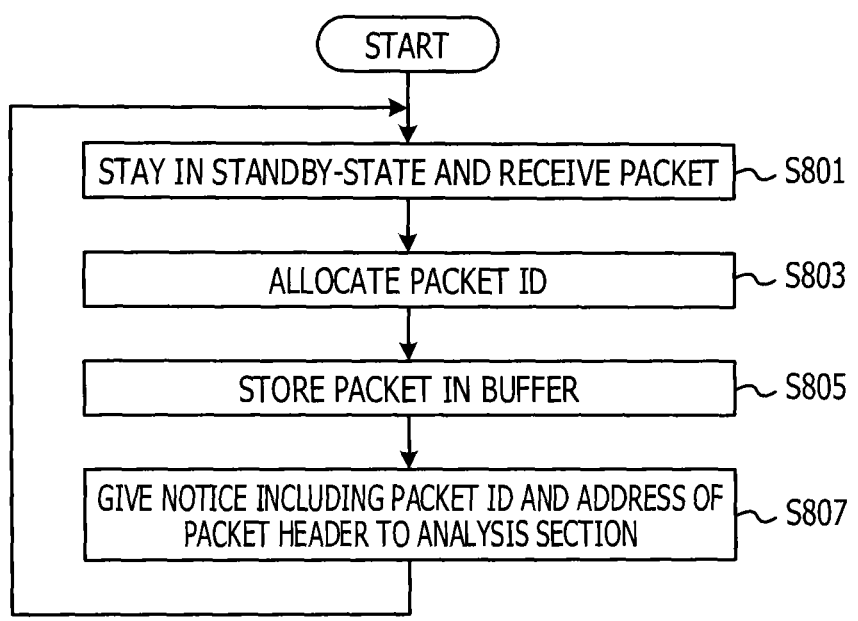
FIG. 8 is a flow chart illustrating an allocation processing flow.

Processing performed in the network monitoring apparatus 101 will be described below. First, allocation processing performed by the driver 113 will be described. FIG. 8 is a flow chart illustrating an allocation processing flow of the driver 113. The driver 113 allocates a packet ID to each of packets captured from the monitoring target network 103 and stores each of the packets in the packet buffer 115.

The driver 113 stays in a standby state, and then, receives a packet from the NIC 111 (S801). When the driver 113 receives a packet from the NIC 111, the driver 113 allocates a packet ID to the received packet (S803). The packet ID is sequentially allocated. Then, the driver 113 stores a packet in the packet buffer 115 (S805). Also, the driver 113 gives a notice including the packet ID and the address of a packet header to the analysis section 117 (S807). Then, the process returns to the processing of S801. The description of the allocation processing performed by the driver 113 is ended here.

Figure 9:
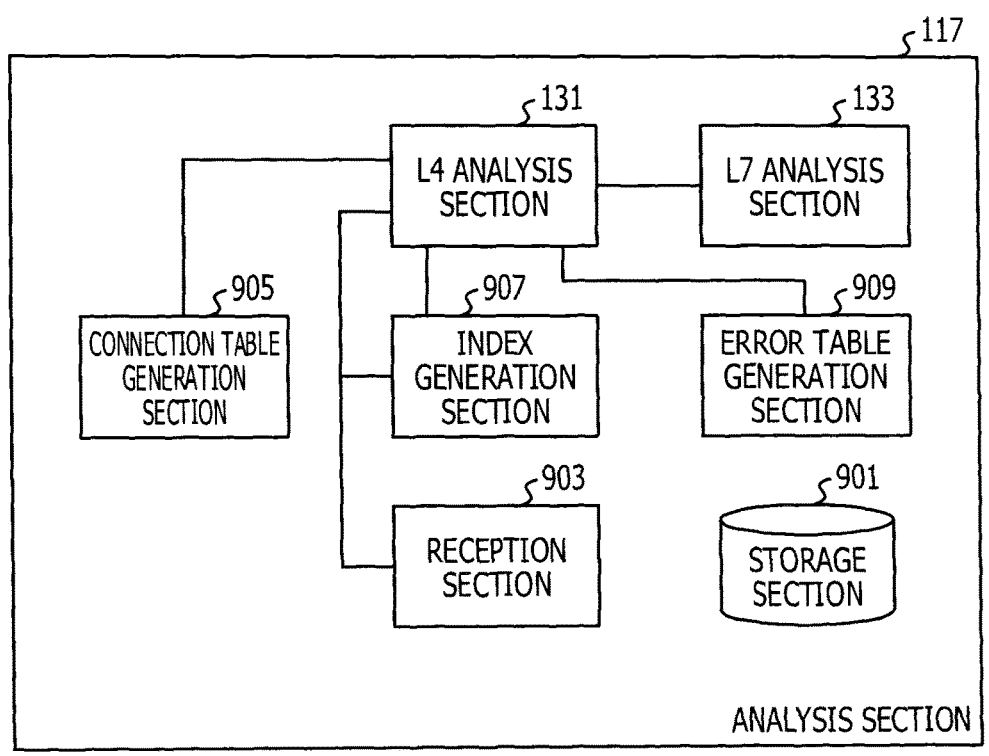
FIG. 9 is a diagram illustrating an example module configuration of an analysis section.

Next, a module configuration of the analysis section 117 will be described. FIG. 9 is a diagram illustrating an example module configuration of the analysis section 117. The analysis section 117 includes, in addition to the L4 analysis section 131 and the L7 analysis section 133, a storage section 901, a reception section 903, a connection table generation section 905, an index generation section 907, and an error table generation section 909.

The storage section 901 stores data used in the analysis section 117. The reception section 903 receives a notice from the driver 113. The connection table generation section 905 generates a connection table. The index generation section 907 generates an index record. The error table generation section 909 generates an error table.

The storage section 901, the reception section 903, the connection table generation section 905, the index generation section 907, and the error table generation section 909 are realized, for example, by the hardware resources illustrated in FIG. 38. As for the reception section 903, the connection table generation section 905, the index generation section 907, and the error table generation section 909, some or all of processes of the corresponding module may be realized by causing the central processing unit (CPU) 2503 (FIG. 38) to sequentially execute programs loaded to the memory 2501 (FIG. 38). The description of the module configuration of the analysis section 117 is ended here.

Figure 10:
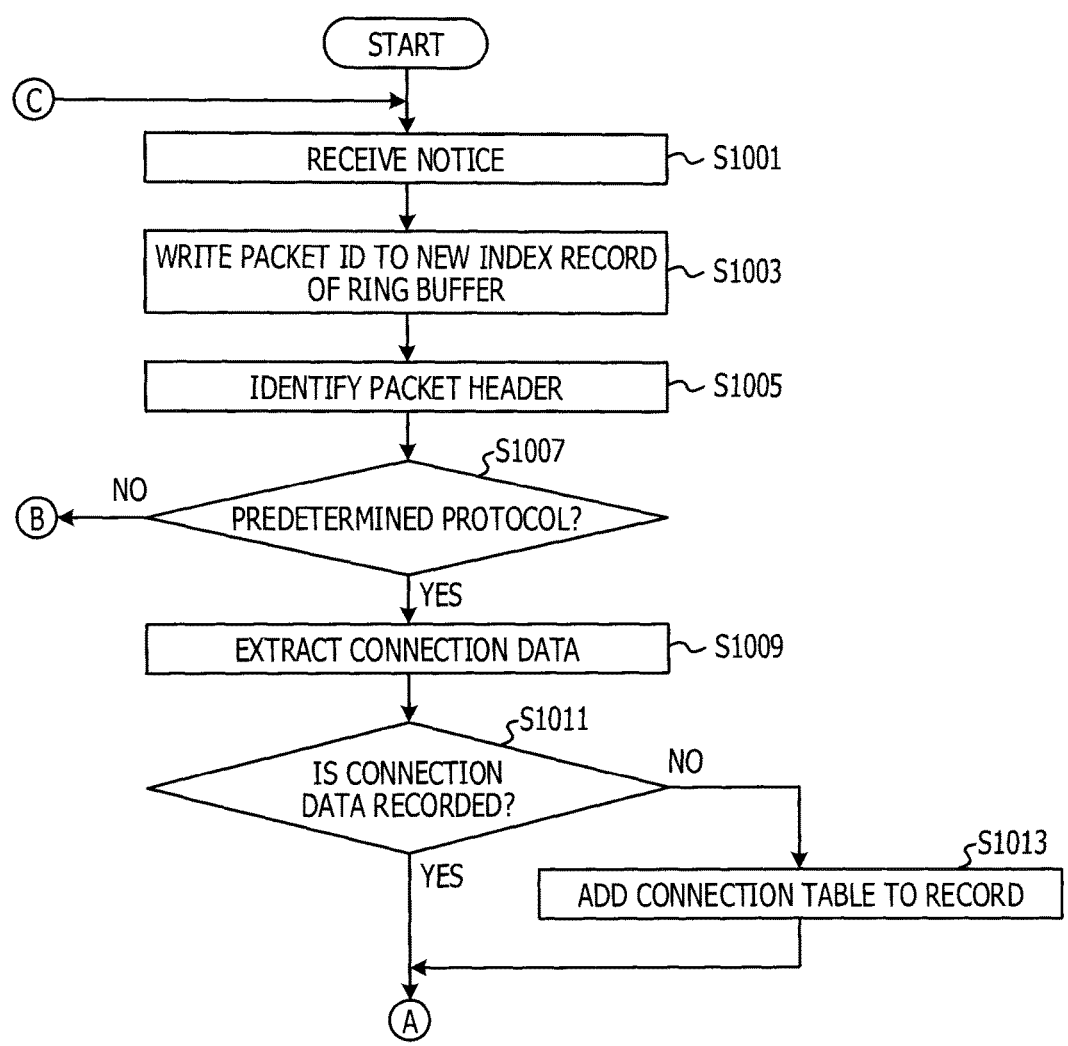
FIG. 10 is a flow chart illustrating a processing flow of the analysis section.
Figure 11:
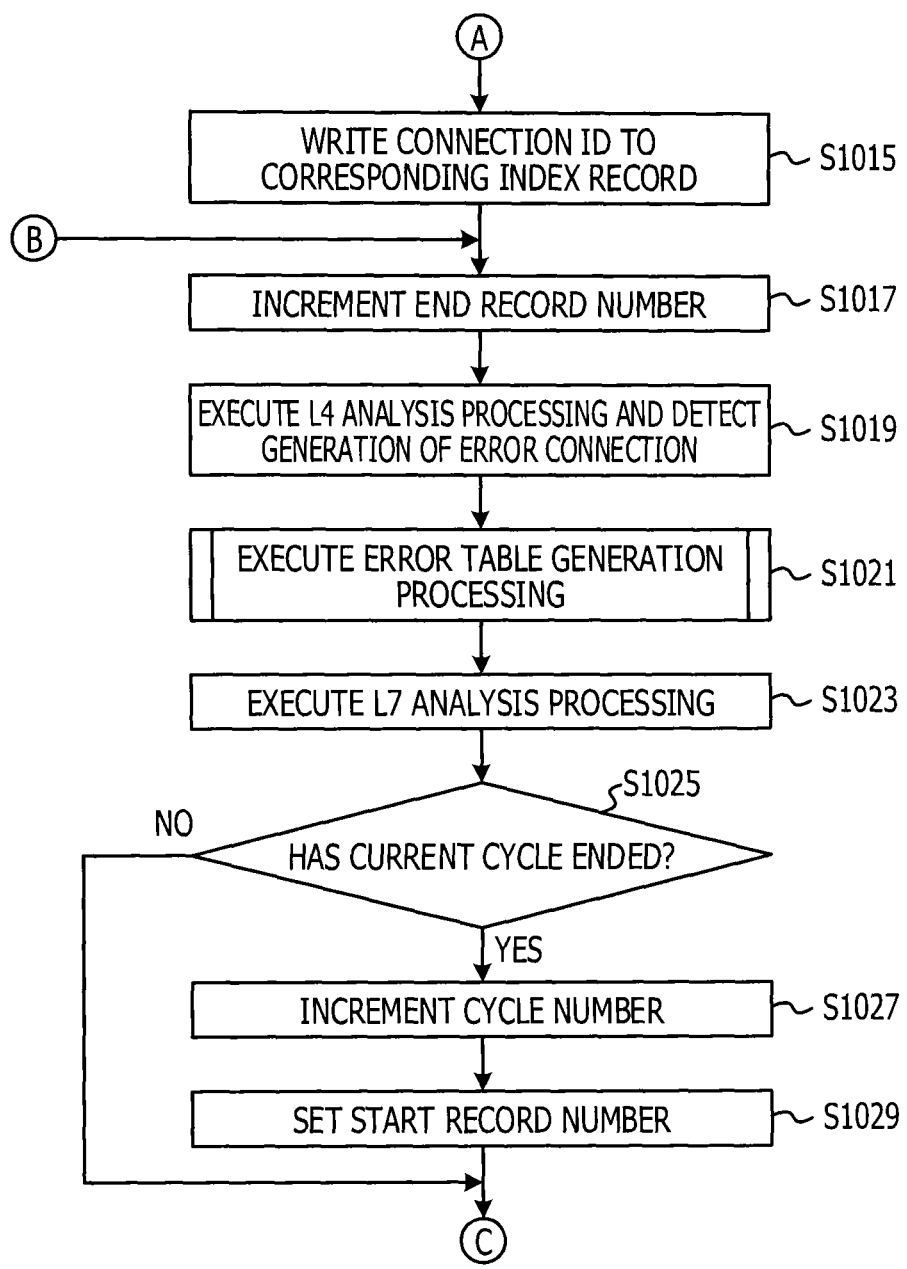
FIG. 11 is a flow chart illustrating a processing flow of the analysis section.

Next, the processing of the analysis section 117 will be described. Each of FIG. 10 and FIG. 11 is a flow chart illustrating a processing flow of the analysis section 117. When the reception section 903 receives a notice from the driver 113 (S1001), the index generation section 907 writes a packet ID obtained from the notice to a new index record of the ring buffer 301 (51003). When the final index record has been reached, the initial index record serves as the next index record.

The L4 analysis section 131 identifies a packet header by an address included in the notice (S1005). The L4 analysis section 131 determines whether or not the protocol of the corresponding packet is a predetermined protocol (S1007). Predetermined protocols are, for example, TCP and UDP. Predetermined protocols may be set, for example, in a protocol table stored in the storage section 901. If the L4 analysis section 131 determines that the protocol of the corresponding packet does not correspond to the predetermined protocol, the process proceeds to the processing of S1017 of FIG. 11 via a terminal B. In this case, the field of the connection ID in the new record remains unset.

On the other hand, if the L4 analysis section 131 determines that the protocol of the corresponding packet corresponds to the predetermined protocol, the L4 analysis section 131 extracts connection data from the packet header (S1009). The connection data includes a transmission source IP address, a transmission source port number, a transmission destination IP address, a transmission destination port number, and a protocol number. The connection table generation section 905 determines whether or not the connection data has been already registered in a connection table (FIG. 2) (S1011). If the connection table generation section 905 determines that the connection data has been already registered in the connection table, the process proceeds to the processing S1015 of FIG. 11 via a terminal A.

If the connection table generation section 905 determines that the connection data has not yet registered in the connection table, the connection table generation section 905 adds a record to the connection table (S1013). A new connection ID and the corresponding connection data are set for the new record. Specifically, the connection ID, the transmission source IP address, the transmission source port number, the transmission destination IP address, the transmission destination port number, and the protocol number are set. When the processing of S1013 is ended, the process proceeds to the processing of S1015 of FIG. 11 via the terminal A.

Moving to the processing of FIG. 11, the index generation section 907 writes a connection ID to the corresponding index record (S1015). The connection ID is identified based on the connection table.

The index generation section 907 increments the end record number (S1017). When the final index record has been reached, the next final record number is the initial record number.

Subsequently, the L4 analysis section 131 executes L4 analysis processing (S1019). In the L4 analysis processing, the L4 analysis section 131 detects a connection in which an error has occurred. The L4 analysis section 131 in this example detects a connection in which "loss increase" has occurred, a connection in which "RTT increase" has occurred, and a connection in which "server delay increase" has occurred. The L4 analysis section 131 outputs the ID of a connection in which an error has occurred, for example, as a detection result for each error type. The L4 analysis processing is similar to known processing, and therefore, will not be further described.

In this example, an error is detected by the L4 analysis processing performed by the L4 analysis section 131, but an error may be detected by L7 analysis processing performed by the L7 analysis section 133. Also, an error may be detected by L4 statistical processing performed by the L4 statistics section 135. As another alternative, an error may be detected by L7 statistical processing performed by the L7 statistics section 137.

Figure 12:
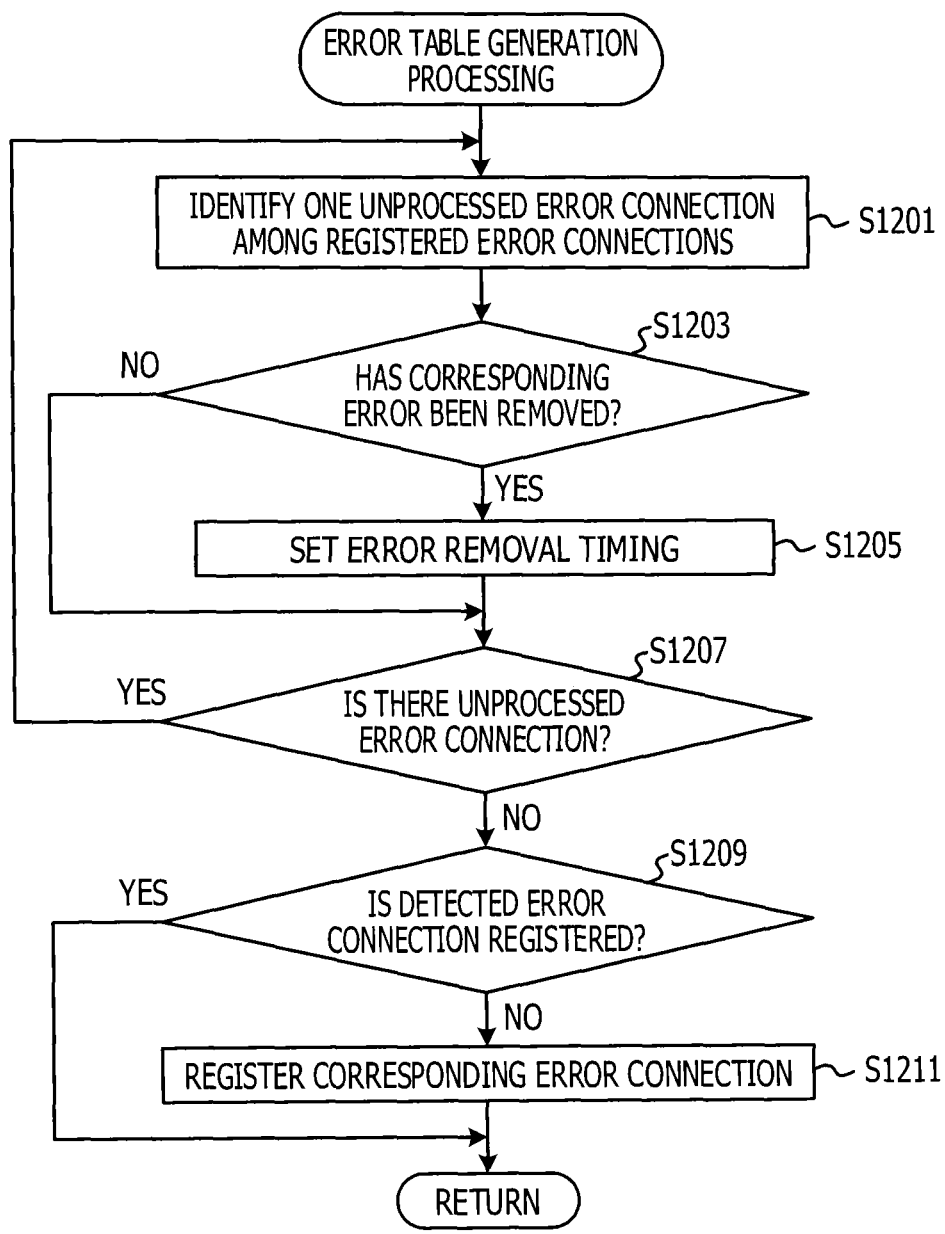
FIG. 12 is a flow chart illustrating an error table generation flow.

The error table generation section 909 executes error table generation processing (S1021). FIG. 12 is a flow chart illustrating an error table generation processing flow. The error table generation section 909 identifies one unprocessed error connection among error connections registered in the error table (S1201). In this case, the error table generation section 909 sequentially identifies connection IDs, for example, set in each of the error tables illustrated in FIG. 5-FIG. 7.

The error table generation section 909 determines whether or not the corresponding error connection has been removed (S1203). Specifically, if the connection ID identified in S1201 matches the ID of the connection on which L4 analysis processing has been performed and an error has not occurred therein, the error table generation section 909 determines that the error has been removed.

If the error table generation section 909 determined that the corresponding error connection has been removed, the error table generation section 909 sets an error removal timing corresponding to the corresponding connection ID (S1205). In this example, the time at which removal of an error was detected is identified by the current cycle number. Specifically, the current cycle number is set in the field for the error removal timing in a record of the error table. The current cycle number is stored in the storage section 901. Then, the process proceeds to the processing of S1207.

FIG. 13 is a table illustrating an example of the error table in which the error removal timing is set. The first record in this embodiment indicates that the "loss increase" that has occurred in the connection identified by the connection ID "CN-0001" was removed in the tenth cycle.

If the error table generation section 909 determines that the corresponding error connection has not been removed, accordingly, the process proceeds directly to the processing to S1207.

The error table generation section 909 determines whether or not there is an unprocessed error connection regarding S1203 (S1207). If the error table generation section 909 determines that there is an unprocessed error connection regarding S1203, the process returns to S1201 to repeat the above-described processing.

If the error table generation section 909 determines that there is not an unprocessed error connection regarding S1203, the error table generation section 909 determines whether or not the detected error connection is registered (S1209). For example, when the ID of the error connection has been already set in the error table, the error table generation section 909 determines that the corresponding error connection is registered and ends the error table generation processing.

If the error table generation section 909 determines that the corresponding error connection is not registered, the error table generation section 909 registers the corresponding connection (S1211). Specifically, the error table generation section 909 sets the ID of the corresponding error connection in the field for the connection ID of a new record in the error table relating to the detected error type. Then, the error table generation section 909 ends the error table generation processing and the process proceeds to the processing of S1023 illustrated in FIG. 11.

Returning to the description of FIG. 11, the L7 analysis section 133 executes L7 analysis processing (S1023). The L7 analysis processing is similar to known processing, and therefore, will not be further described.

The index generation section 907 performs the following processing in order to perform cycle management. The index generation section 907 determines whether or not the current cycle has ended (S1025). For example, when predetermined time has elapsed since the current cycle started, the index generation section 907 determines that the current cycle has ended. If the index generation section 907 determines that the current cycle has ended, the index generation section 907 increments the cycle number (S1027). Furthermore, the index generation section 907 sets a start record number (S1029). The start record number that is to be set indicates the next record to the end record at the current time point.

In this example, cycle management is performed in the index generation section 907, but a cycle management section may be provided to perform cycle management separately from the processing of the index generation section 907.

When the processing illustrated in FIG. 11 is ended, the process returns to the processing of S1001 illustrated in FIG. 10 via a terminal C to repeat the above-described processing. The description of the processing of the analysis section 117 is ended here.

Figure 14:
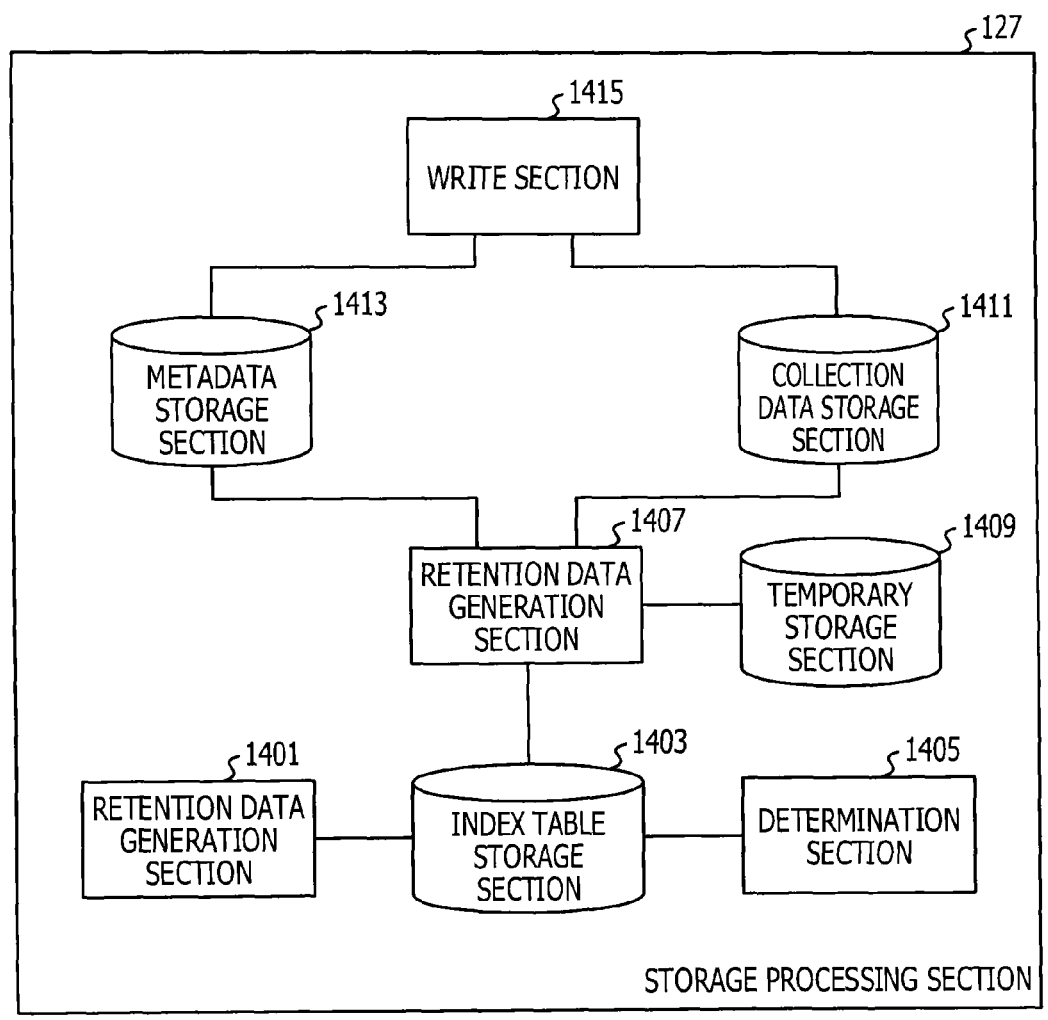
FIG. 14 is a diagram illustrating an example module configuration of a storage processing section.

Subsequently, the storage processing section 127 will be described. A module configuration of the storage processing section 127 will be described. FIG. 14 is a diagram illustrating an example module configuration of the storage processing section 127. The storage processing section 127 includes a read section 1401, an index table storage section 1403, a determination section 1405, a retention data generation section 1407, a temporary storage section 1409, a collection data storage section 1411, a metadata storage section 1413, and a write section 1415.

The read section 1401 reads an index record from the index buffer 123 and causes the index table storage section 1403 to store an index table including the read index record. The index table storage section 1403 stores the index table divided for each cycle. The determination section 1405 determines, based on the cycle number, whether or not the index table is to be made to be a retention target. The retention data generation section 1407 generates retention data based on the index table that has been made to be a retention target. The temporary storage section 1409 temporarily stores a packet group that has been read together at a time from the packet buffer 115. The collection data storage section 1411 stores collection data that is a part of the retention data. The metadata storage section 1413 stores metadata that is a part of the retention data. The write section 1415 writes the retention data to the retention data storage section 143 of the storage device 109.

The read section 1401, the index table storage section 1403, the determination section 1405, the retention data generation section 1407, the temporary storage section 1409, the collection data storage section 1411, the metadata storage section 1413, and the write section 1415 are realized, for example, by the hardware resources illustrated in FIG. 38. As for the read section 1401, the determination section 1405, the retention data generation section 1407, and the write section 1415, some or all of processes of the corresponding module may be realized by causing the central processing unit (CPU) 2503 (FIG. 38) to sequentially execute programs loaded to the memory 2501 (FIG. 38). The description of the module configuration of the storage processing section 127 is ended here.

Next, the index table will be described. FIG. 15 is a diagram illustrating an example of the index table storage section 1403. The index table storage section 1403 stores an index table 1501 for each cycle. An index table storage section 1501*a* includes an index record relating to a packet received in the first cycle. An index table storage section 1501*b* includes an index record relating to a packet received in the second cycle. An index table 1501*c* includes an index record relating to a packet received in the third cycle.

The index table 1501 includes a header portion. In the header portion, a field used for setting the cycle number and a field used for setting a retention flag. The retention flag is set to be on when a timing with which the packet identified by the corresponding index table 1501 is to be retained has been reached.

In this example, for any of the index tables 1501*a*-1501*c*, the timing with which a packet is to be retained has not been reached yet.

The data main body of the ring buffer 301 includes an index record for each packet. The index record has a similar configuration to that of the packet buffer 115.

The first record of the index table 1501a indicates that the packet received first in the first cycle is identified by the packet ID "PC-000001" and the connection of the packet is identified by the connection ID "CN-0001".

Similarly, the second record of the index table 1501a indicates that the packet received second in the first cycle is identified by the packet ID "PC-000002" and the connection of the packet is identified by the connection ID "CN-0002".

Similarly, the third record of the index table 1501a indicates that the packet received third in the first cycle is identified by the packet ID "PC-000003" and the connection of the packet is identified by the connection ID "CN-0002".

The first record of the index table 1501b indicates that the packet received first in the second cycle is identified by the packet ID "PC-100001" and the connection of the packet is identified by the connection ID "CN-0003".

Similarly, the second record of the index table 1501b indicates that the packet received second in the second cycle is identified by the packet ID "PC-100002" and the connection of the packet is identified by the connection ID "CN-0002".

Similarly, the third record of the index table 1501b indicates that the packet received third in the second cycle is identified by the packet ID "PC-100003" and the connection of the packet is identified by the connection ID "CN-0004".

The first record of the index table 1501c indicates that the packet received first in the third cycle is identified by the packet ID "PC-200011" and the connection of the packet is identified by the connection ID "CN-0003".

Similarly, the second record of the index table 1501c indicates that the packet received second in the third cycle is identified by the packet ID "PC-200012" and the connection of the packet is identified by the connection ID "CN-0002".

Similarly, the third record of the index table 1501c indicates that the packet received third in the third cycle is identified by the packet ID "PC-200013" and the connection of the packet is identified by the connection ID "CN-0004". The description of the index table is ended here.

Figure 16:
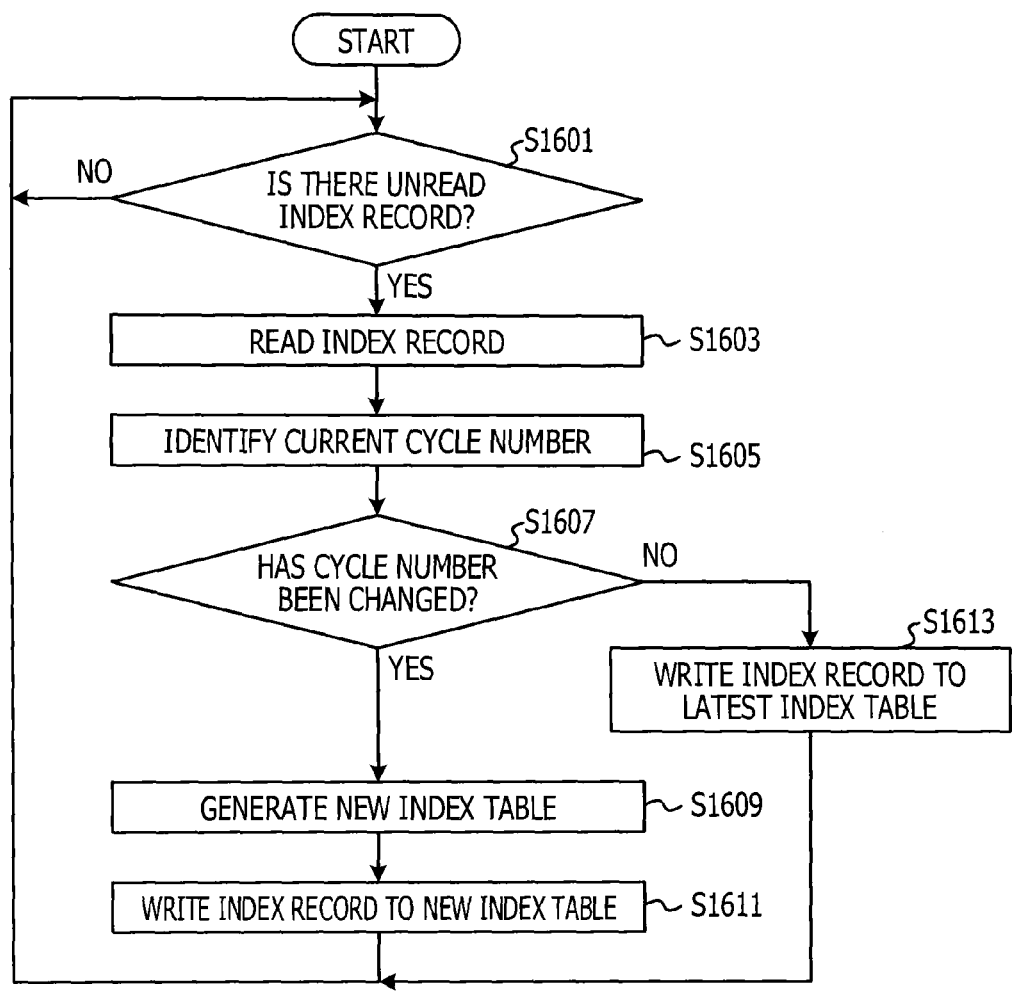
FIG. 16 is a flow chart illustrating a processing flow of a read section.

Next, the processing of the read section 1401 will be described. FIG. 16 is a flow chart illustrating a processing flow of the read section 1401. The read section 1401 sequentially reads index records from the ring buffer 301 of the index buffer 123, and stores the read index records in the index table 1501 of the index table storage section 1403. Therefore, the read section 1401 determines whether or not there is an unread index record (S1601). If the read section 1401 determines that there is not an unread index record, the read section 1401 performs the processing of S1601 again.

If the read section 1401 determines that there is an unread index record, the read section 1401 reads the corresponding index record (S1603).

The read section 1401 identifies the current cycle number (S1605). The read section 1401 reads the cycle number, for example, set in the header portion of the ring buffer 301. As another alternative, the read section 1401 may be configured to obtain the current cycle number from the analysis section 117. Also, the read section 1401 may be configured to divide time elapsed since the generation of an index was started by time corresponding to one cycle and add one to the obtained quotient to thereby identify the current cycle number.

Then, the read section 1401 determines whether or not the cycle number has been changed (S1607). Specifically, when the current cycle number identified in S1605 has increased by one from the previous cycle number, the read section 1401 determines that the cycle number has been changed.

If the read section 1401 determines that the cycle number has been changed, the read section 1401 generates a new index table 1501 in the index table storage section 1403 (S1609). In the field for the cycle number in the new index table 1501, the current cycle number identified in S1605 is set. Also, the field for retention in the new index table 1501 is set to be off.

The read section 1401 writes an index record to the new index table 1501 (S1611). In this case, the read section 1401 copies the index record read in S1603 to the initial record of the new index table 1501. Then, the process returns to the processing of S1601.

On the other hand, if the read section 1401 determines that the cycle number is not changed, the read section 1401 writes an index record to the latest index table 1501 (S1613). That is, the read section 1401 adds the next index record to the index table 1501 in which index records were written up to that time point. Then, the process returns to the processing of S1601.

An example in which one index record is read in S1603 and the processing of S1605-S1613 is performed for each index record has been described above, but a plurality of index records may be read in S1603 and each index record is allocated to the corresponding index table in the processing of S1605-S1613. The description of the processing of the read section 1401 is ended here.

Figure 17:
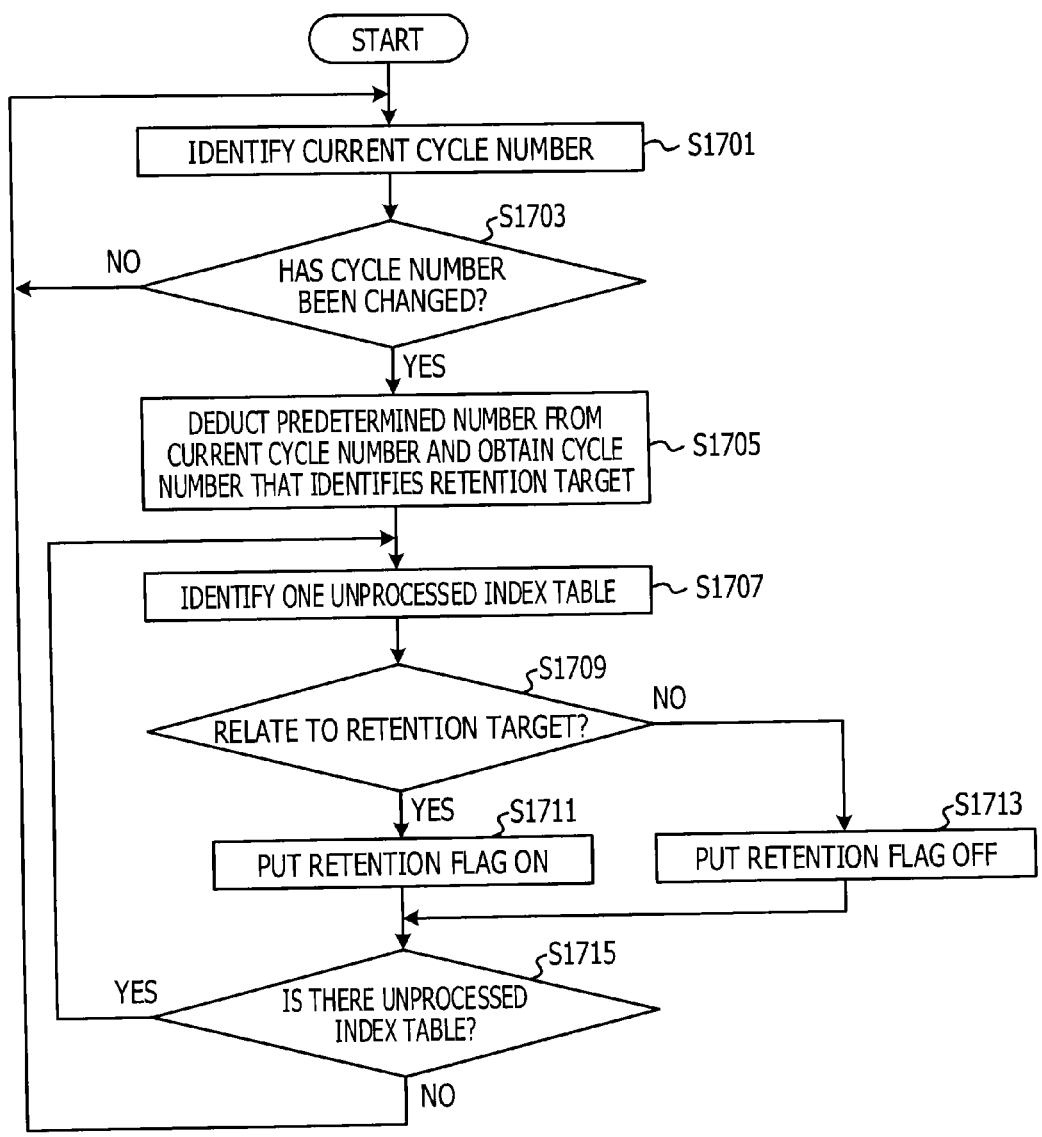
FIG. 17 is a flow chart illustrating a processing flow of a determination section.

Next, the processing of the determination section 1405 will be described. FIG. 17 is a flow chart illustrating a processing flow of the determination section 1405. The determination section 1405 put the retention flag of the index table 1501 relating to the cycle a predetermined cycle number before the current cycle to be on. By this processing, packets stored in the packet buffer 115 in the previous cycle prior to the cycle in which an error connection was detected are collected.

Therefore, the determination section 1405 identifies the current cycle umber (S1701). The determination section 1405 reads the current number, for example, set in the header portion of the ring buffer 301. As another alternative, the determination section 1405 may be configured to obtain the current cycle number from the analysis section 117. Also, the determination section 1405 may be configured to divide time elapsed since the generation of an index was started by time corresponding to one cycle and add one to the obtained quotient to thereby identify the current cycle number.

Then, the determination section 1405 determines whether or not the cycle number has been changed (S1703). Specifically, when the current cycle number identified in S1701 has increased by one from the prior cycle number, the determination section 1405 determines that the cycle number has been changed. If the determination section 1405 determines that the cycle number has not been changed, the process returns to the processing of S1701.

If the determination section 1405 determines that the cycle number has been changed, the determination section 1405 subtracts a predetermined number from the current cycle number to obtain the cycle number that identifies a retention target (S1705). For example, if the predetermined number is four, a packet stored in the packet buffer 115 in the cycle four before the current cycle is a retention target. Note that, at this time point, the packet that is to be a retention target still remains in the packet buffer 115.

The determination section 1405 identifies one unprocessed index table 1501 in the index table storage section 1403 (S1707). For example, the determination section 1405 sequentially identifies the index tables 1501 in the index table storage section 1403 in chronological order.

The determination section 1405 determines whether or not the index table 1501 identified in S1707 relates to the retention target (S1709). Specifically, when the cycle number in the index table 1501 identified in S1707 matches the cycle umber of the retention target obtained in S1705, the determination section 1405 determines that the corresponding index table 1501 relates to the retention target.

If the determination section 1405 determines that the index table 1501 identified in S1707 relates to the retention target, the determination section 1405 sets the retention flag of the corresponding index table 1501 to be on (S1711). If the determination section 1405 determines that the index table 1501 identified in S1707 does not relate to the retention target, the determination section 1405 sets the retention flag of the corresponding index table 1501 to be off (S1713).

The determination section 1405 determines whether or not there is an unprocessed index table 1501 regarding S1709 (S1715). If the determination section 1405 determines that there is an unprocessed index table 1501 regarding S1709, the process returns to the processing of S1707. If the determination section 1405 determines that there is not an unprocessed index table 1501 regarding S1709, the process returns to the processing of S1701. The description of the processing of the determination section 1405 is ended here.

Figure 18:
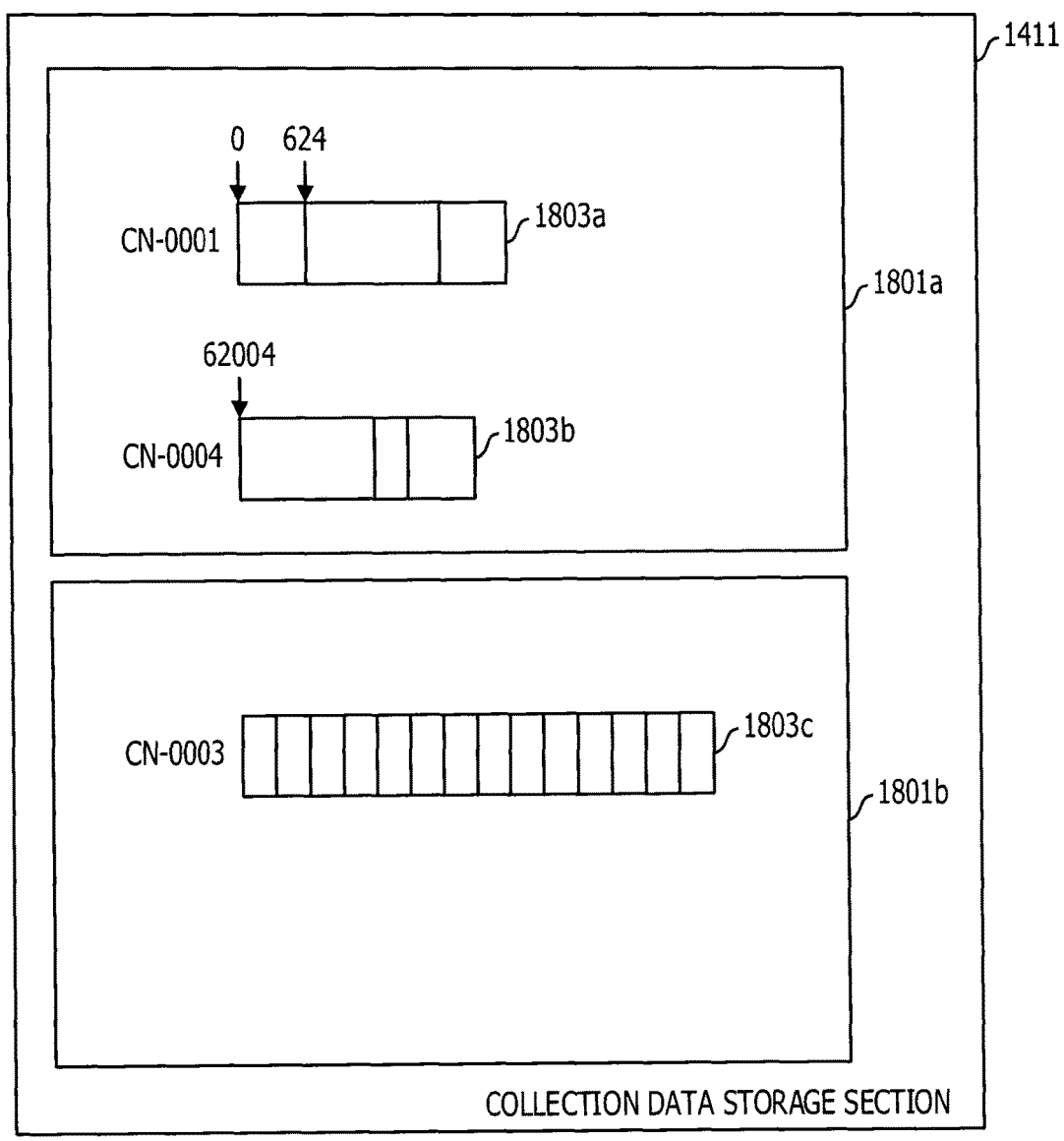
FIG. 18 is a diagram illustrating an example collection data storage section.

Next, the collection data generated by the processing of the retention data generation section 1407 will be described. FIG. 18 is a diagram illustrating an example of the collection data storage section 1411. The collection data storage section 1411 includes an area used for storing a collection data set 1801 for each error type. Also, collection data 1803 obtained by connecting together packets relating to a connection in which the corresponding error has occurred is stored in the collection data set 1801.

For example, the collection data set 1801a relates to "loss increase". Then, the collection data set 1801a includes collection data 1803a obtained by connecting together packets relating a connection (Connection ID: "CN-0001") in which "loss increase" has occurred and collection data 1803b, similarly, obtained by connecting together packets relating a connection (Connection ID: "CN-0004") in which "loss increase" has occurred. Note that, in this example, the offset that represents the initial location of the first packet in the collection data 1803a is "0" and, similarly, the offset that represents the initial location of the second packet in the collection data 1803a is "624". Furthermore, the offset that represents the initial location of the first packet in the collection data 1803b is "62004".

A collection data set 1801b relates to "RTT increase". Then, the collection data set 1801b stores collection data 1803c obtained by connecting together packets relating to a connection (Connection ID: "CN-0003") in which "RTT increase" has occurred.

Subsequently, the metadata generated by the processing of the retention data generation section 1407 will be described. FIG. 19 is a table illustrating an example of the metadata. The metadata is provided in association with the collection data 1803. The metadata illustrated in FIG. 19 is associated with the collection data 1803a illustrated in FIG. 18. The metadata includes a header portion and a table portion.

The header portion includes a field used for setting a connection ID, a field used for setting a transmission source IP address, a field used for setting a transmission source port number, a field used for setting a transmission destination IP address, a field used for setting a transmission destination port number, and a field used for setting a protocol number.

The header portion in this example indicates that the metadata corresponds to the collection data 1803a of the packet relating to the connection of the connection ID "CN-0001". Also, the header portion in this example indicates that, for this connection, the port number "2000" in a host apparatus having the IP address "10. 20. 30. 40" corresponds to a transmission source and the port number "20" in a host apparatus having the IP address "10. 20. 30. 50" corresponds to a transmission destination. Furthermore, the header portion in this example also indicates that the protocol of the fourth layer in this connection is TCP.

In the table portion, a record for each packet included in the collection data 1803a is provided. In the record, a field used for setting a packet ID and a field used for setting an offset are provided. This example indicates that the first packet is identified by the packet ID "PC-000001" and is stored with the offset "0" located in an initial location. Furthermore, this example indicates that the second packet is identified by the packet ID "PC-000006" and is stored with the offset "624" located in an initial location.

Similarly, for the collection data 1803b and the collection data 1803c illustrated in FIG. 18, the metadata is provided.

Next, the higher-order metadata generated in the metadata storage section 1413 will be described. FIG. 20 is a table illustrating an example of the higher-order metadata. The higher-order metadata is provided for each error type. The higher-order metadata includes a header portion and a table portion. In the header portion, a field used for setting an error type is provided. In this example, "loss increase" is set.

In the record of the table portion, a field used for setting a connection ID and a field used for setting a start offset are provided. The first record of the table portion in this example indicates that the first metadata relates to the connection ID "CN-0001" and the first collection data 1803a is stored with the offset "0" located in the initial location. Similarly, the second record of the table portion in this example indicates that the second metadata relates to the connection ID "CN-0004" and the second collection data 1803b is stored with the offset "62004" located in the initial location.

Figure 21:
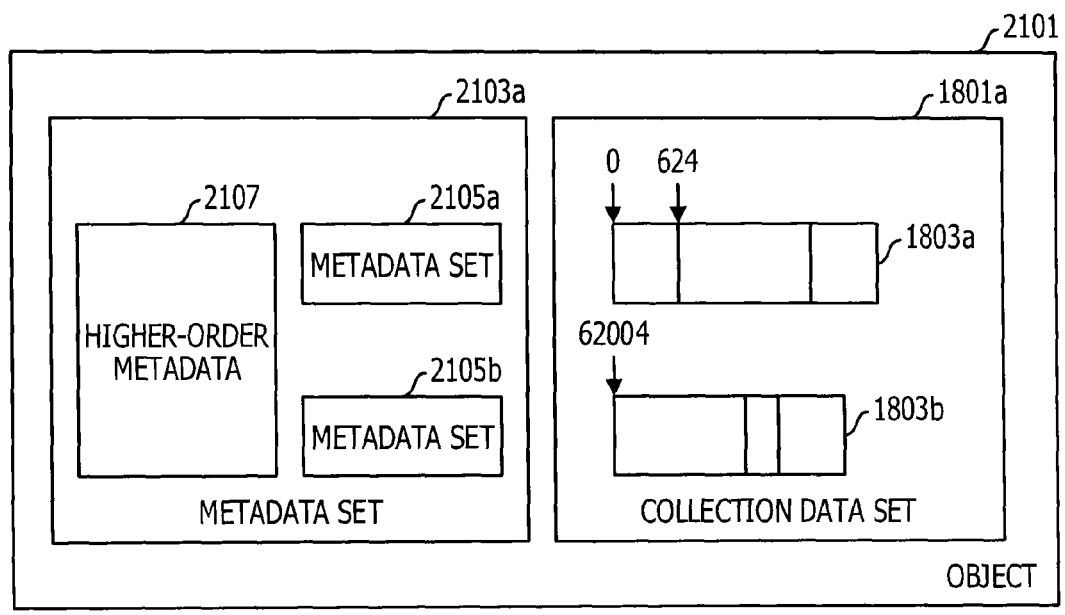
FIG. 21 is a diagram illustrating an example of retention data.

Next, the retention data written by the write section 1415 will be described. FIG. 21 is a table illustrating an example of the retention data. The retention data according to this embodiment has a configuration of an object 2101 illustrated in FIG. 21. The object 2101 includes a collection data set 1801. The collection data set 1801a in this example includes the collection data 1803a and the collection data 1803b.

The object 2101 includes a metadata set 2103. A metadata set 2103a in this example includes metadata 2105a relating to the collection data 1803a, metadata 2105b relating to the collection data 1803b, and furthermore, higher-order metadata 2107 relating to these pieces of metadata 2105.

Figure 22:
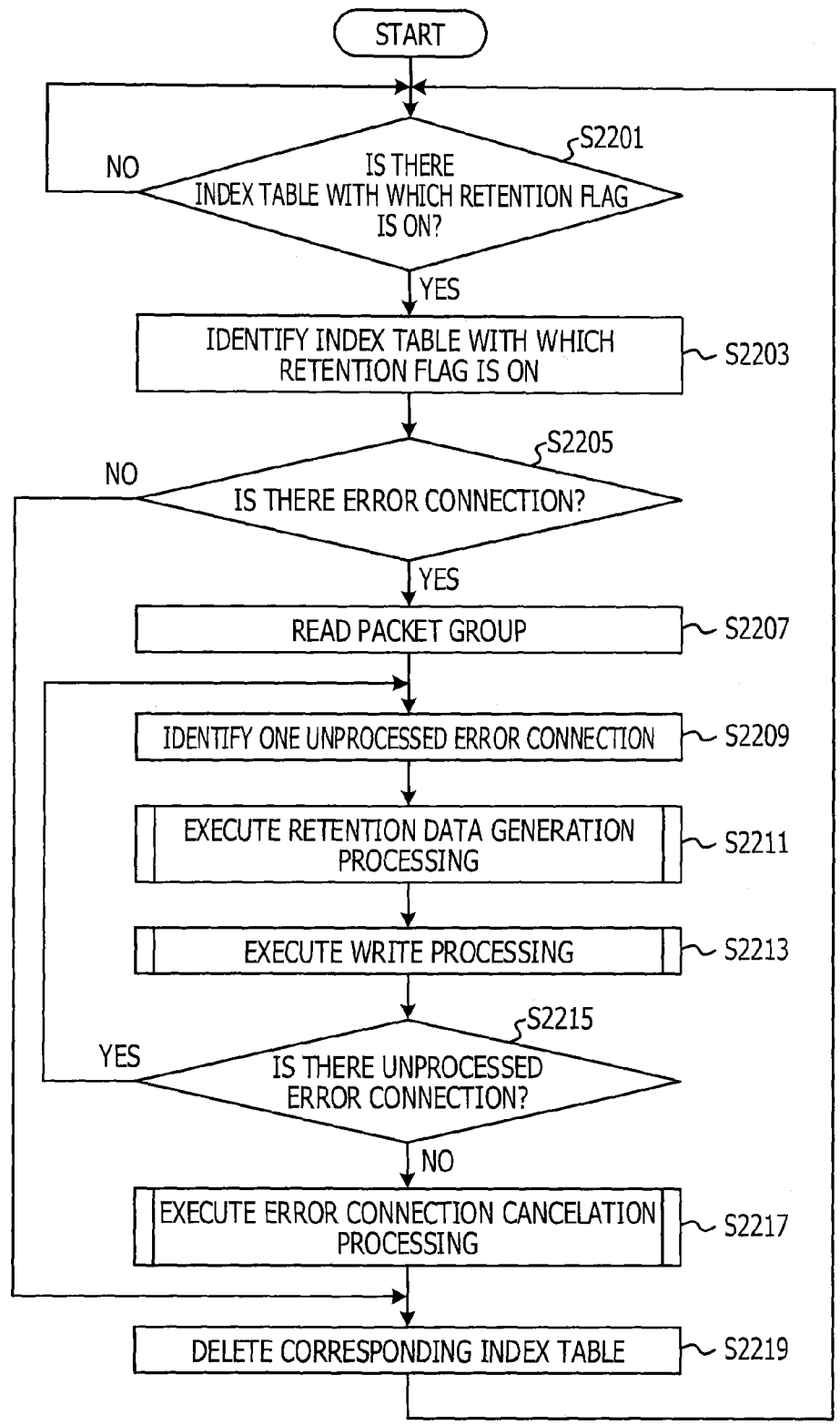
FIG. 22 is a flow chart illustrating a processing flow of the storage processing section.

Next, FIG. 22 is a flow chart illustrating a processing flow of the storage processing section 127. The retention data generation section 1407 determines whether or not there is an index table 1501 with which the retention flag is on (S2201). If the retention data generation section 1407 determines that there is not an index table 1501 with which the retention flag is on, the retention data generation section 1407 repeats the processing of S2201.

If the retention data generation section 1407 determines that there is an index table 1501 with which the retention flag is on, the retention data generation section 1407 identifies the index table 1501 with which the retention flag is on (S2203). As illustrated in FIG. 17, the index table 1501 with which the retention flag is on is the index table 1501 relating to the cycle a predetermined number before the current cycle. A packet that is to be collected is selected from packets managed in the index table 1501.

The retention data generation section 1407 determines whether or not there is an error connection at the current time point (S2205). For example, when a connection ID is set in the error tables illustrated in FIG. 5-FIG. 7, the retention data generation section 1407 determines that there is an error connection at the current time point.

In order to reduce the number of times data read from the packet buffer 115 is performed, the retention data generation section 1407 reads a packet group together at a time and causes the temporary storage section 1409 to store the read packet group (S2207). However, when a packet is read one by one by the following processing, the processing of S2207 may be omitted.

The retention data generation section 1407 identifies one unprocessed error connection regarding S2211 and S2213 (S2209). For example, the retention data generation section 1407 sequentially identifies connection IDs included in the error tables illustrated in FIG. 5-FIG. 7.

The retention data generation section 1407 executes retention data generation processing (S2211). In retention data generation processing, new data is generated in the collection data storage section 1411 and the metadata storage section 1413.

Figure 23:
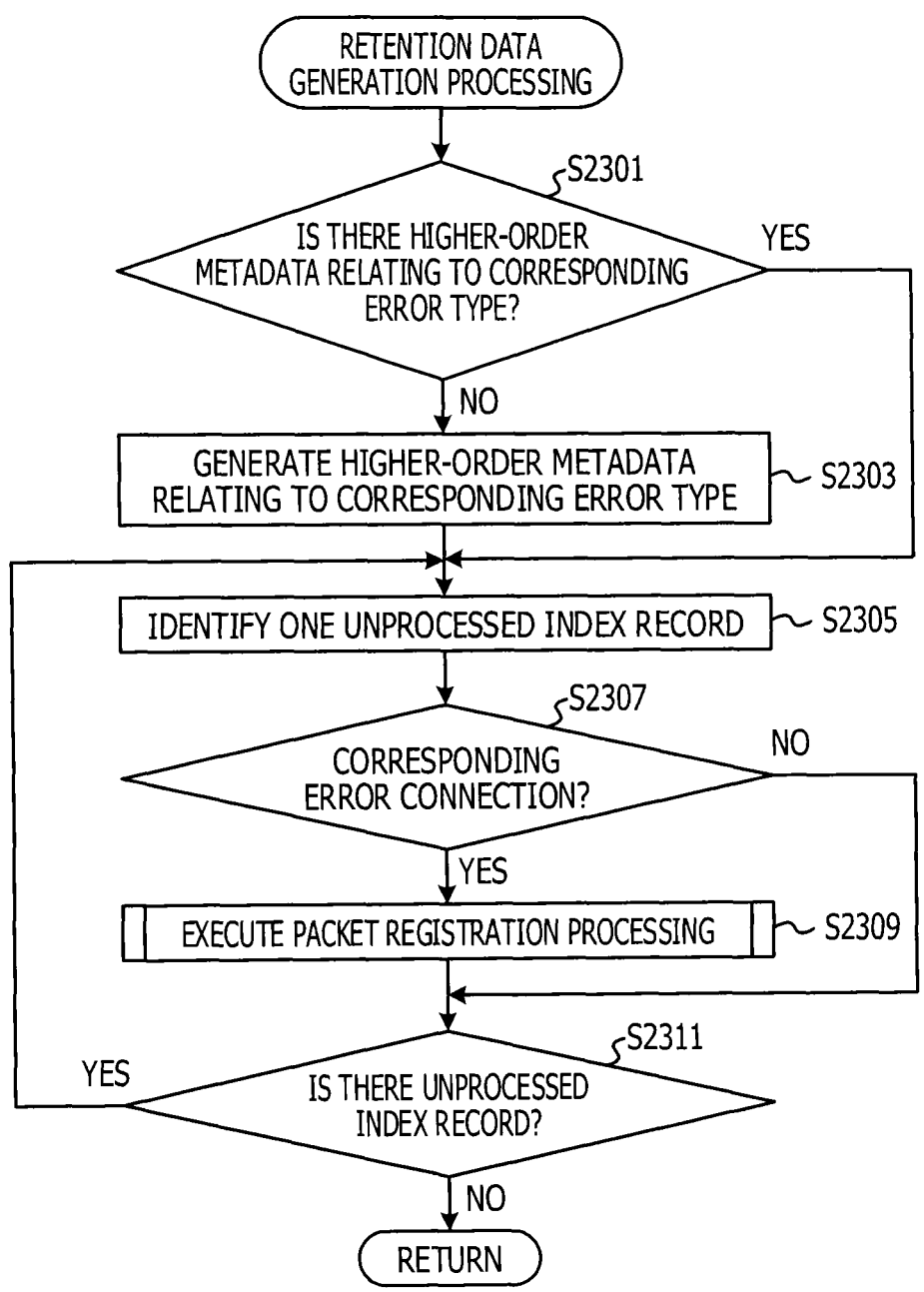
FIG. 23 is a flow chart illustrating a retention data generation processing flow.

FIG. 23 is a flow chart illustrating a retention data generation processing flow. If there is not higher-order metadata relating to the corresponding error type, the retention data generation section 1407 generates higher-order metadata. Therefore, the retention data generation section 1407 determines whether or not there is higher-order metadata relating to the corresponding error type (S2301). The corresponding error type corresponds to an error type in the error table referred to when an error connection is identified in S2209 of FIG. 22.

If the retention data generation section 1407 determines that there is not higher-order metadata relating to the corresponding error type, the retention data generation section 1407 generates higher-order metadata relating to the corresponding error type (S2303). As illustrated in FIG. 20, in the field for the error type in the higher-order metadata, the corresponding error type is set. At this time point, a record is not set in the table portion.

The retention data generation section 1407 identifies one unprocessed index record regarding S2307 in the index table 1501 identified in S2203 of FIG. 22 (S2305). The retention data generation section 1407 sequentially identifies index records, for example, included in the index table 1501.

The retention data generation section 1407 determines whether or not a connection ID in the corresponding index record corresponds to the corresponding error connection (S2307). As described above, the corresponding error connection is identified in S2209 of FIG. 22.

If the retention data generation section 1407 determines that the connection ID in the corresponding index record does not correspond to the corresponding error connection, the packet identified by the corresponding index record is not registered. Therefore, the process proceeds directly to the processing of S2311.

If the retention data generation section 1407 determines that the connection ID in the corresponding index record corresponds to the corresponding error connection, the packet identified by the corresponding index record is registered. Therefore, the retention data generation section 1407 executes packet registration processing (S2309).

Figure 24:
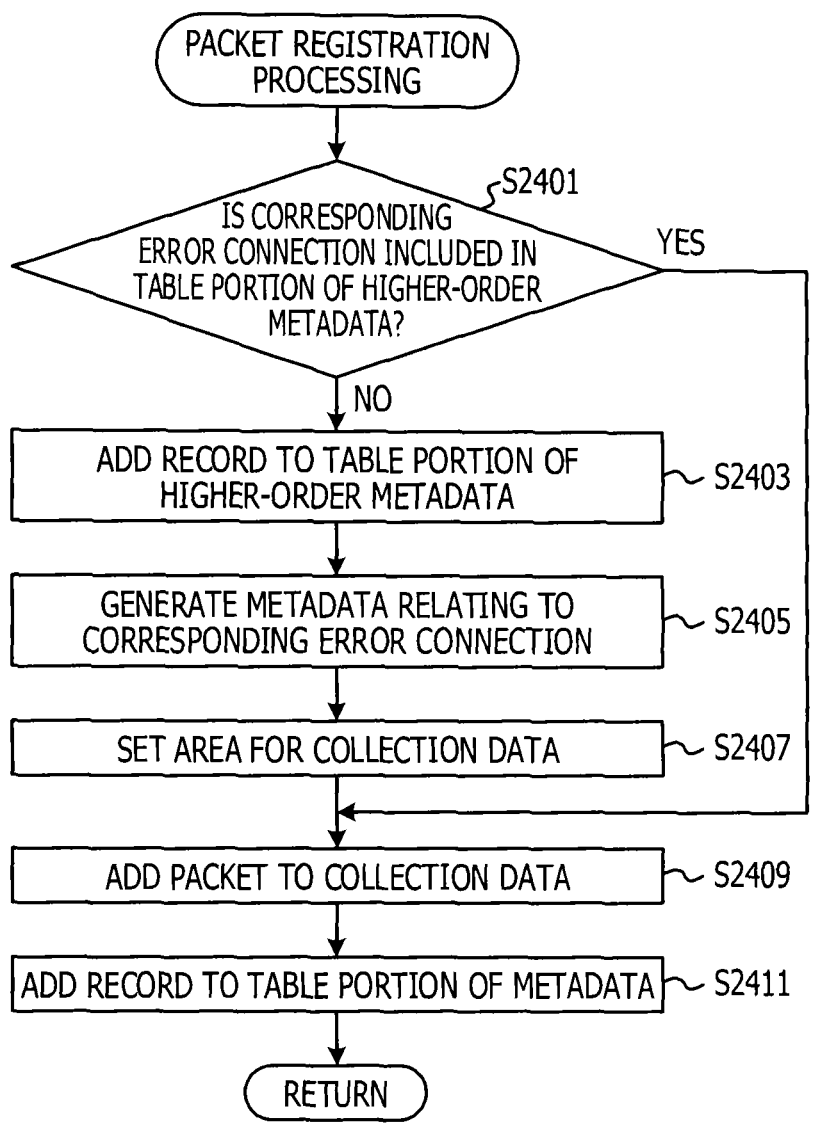
FIG. 24 is a flow chart illustrating a packet registration processing flow.

FIG. 24 is a flow chart illustrating a packet registration processing flow. The retention data generation section 1407 determines whether or not the ID of the corresponding error connection is included in the table portion of the higher-order metadata 2107 (S2401). As described above, the corresponding error connection is identified in S2209 of FIG. 22.

If the retention data generation section 1407 determines that the ID of the corresponding error connection is not included in the table portion of the higher-order metadata 2107, the retention data generation section 1407 adds a record to the table portion of the upper metadata (S2403). In the added record, as described above with reference to FIG. 20, the ID of the corresponding error connection and the start offset are set.

Furthermore, the retention data generation section 1407 generates metadata relating to the corresponding error connection (S2405). In the header portion of the metadata, as described above with reference to FIG. 19, data relating to the corresponding error connection is set.

Also, as illustrated in FIG. 18, the retention data generation section 1407 sets an area for the collection data 1803 corresponding to the corresponding error connection in the collection data storage section 1411 (S2407). Then, the process proceeds to the processing of S2409.

On the other hand, if the retention data generation section 1407 determines that the ID of the corresponding error connection is included in the table portion of the higher-order metadata 2107, the process proceeds directly to the processing of S2409.

The retention data generation section 1407 reads the packet corresponding to the packet ID included in the index record identified in S2305 of FIG. 23 from the temporary storage section 1409, and adds the packet to the collection data corresponding to the corresponding error connection (S2409).

The retention data generation section 1407 further adds a record to the table portion of the metadata (S2411). As illustrated in FIG. 19, in the added record, the packet ID and the offset of the added packet are set. Then, when the packet registration processing is ended, the process returns to the processing of S2311 of FIG. 23.

Returning to the description of FIG. 23, the retention data generation section 1407 determines whether or not there is an unprocessed index record regarding S2307 (S2311). If the retention data generation section 1407 determines that there is an unprocessed index record, the process returns to the processing of S2305 to repeat the above-described processing. On the other hand, if the retention data generation section 1407 determines that there is not an unprocessed index record, the retention data generation processing is ended and the process returns to the processing of S2213 illustrated in FIG. 22.

Thus, the retention data generation section 1407 identifies a plurality of packet IDs corresponding to connection IDs in which an error has occurred, and collects a packet corresponding to each of the packet IDs.

Figure 25:
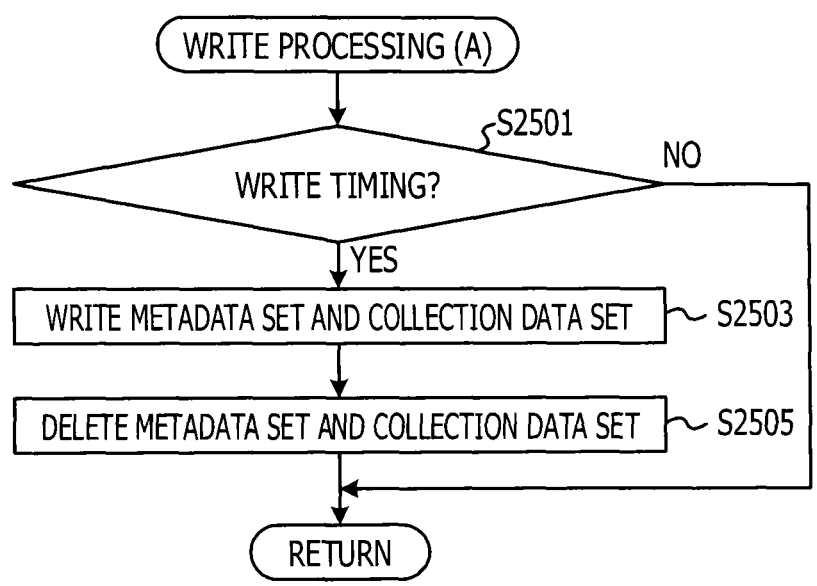
FIG. 25 is a flow chart illustrating a write processing (A) flow.

Returning to the description of FIG. 22, the write section 1415 executes write processing (S2213). In this embodiment, write processing (A) is executed. FIG. 25 is a flow chart illustrating a write processing (A) flow. The write section 1415 determines whether or not a write timing has been reached (S2501). For example, when predetermined intervals have ended, the write section 1415 determines that a write timing has been reached.

If the write section 1415 determines that a write timing has been reached, the write section 1415 writes a metadata set stored in the metadata storage section 1413 and a correction data set stored in the collection data storage section 1411 to the retention data storage section 143 via the transmission network 107 (S2503). In this example, as illustrated in FIG. 21, the write section 1415 writes these pieces of data in accordance with the format of the object 2101.

Then, the write section 1415 deletes the metadata set stored in the metadata storage section 1413 and the collection data set stored in the collection data storage section 1411 (S2505) and ends the write processing (A).

If the write section 1415 determines that a write timing has not been reached, the write section 1415 directly ends the write processing (A). When the write section 1415 ends the write processing (A), the process returns to the processing of S2215 of FIG. 22.

Returning to the description of FIG. 22, the retention data generation section 1407 determines whether or not there is an unprocessed error connection regarding S2211 and S2213 (S2215). If the retention data generation section 1407 determines that there is an unprocessed error connection, the process returns to S2209 to repeat the above-described processing.

On the other hand, if the retention data generation section 1407 determines that there is not an unprocessed error connection, the retention data generation section 1407 executes error connection cancelation processing (S2217).

Figure 26:
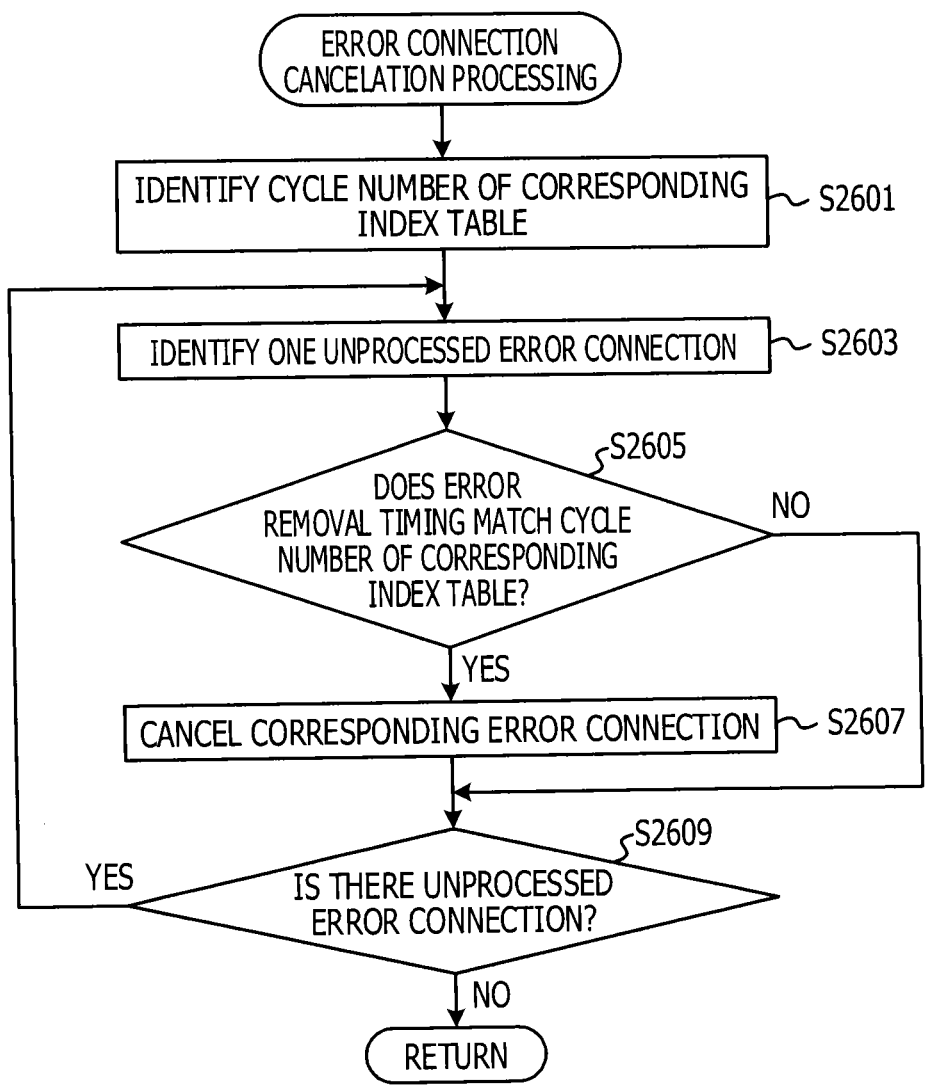
FIG. 26 is a flow chart illustrating an error connection cancelation processing flow.

FIG. 26 is a flow chart illustrating an error connection cancelation processing flow. In error connection cancelation processing, an error connection for which packet collection is ended is cancelled.

The retention data generation section 1407 identifies the cycle number of the corresponding index table 1501 (S2601). As described above, the index table 1501 is identified in S2203 of FIG. 22.

The retention data generation section 1407 identifies one unprocessed error connection regarding S2605 (S2603). For example, the retention data generation section 1407 sequentially identifies connection IDs, for example, included in the error tables illustrated in FIG. 5-FIG. 7.

The retention data generation section 1407 identifies the error removal timing corresponding to the corresponding connection ID in the error table, and determines whether or not the corresponding error removal timing matches cycle number of the corresponding index table 1501 (S2605).

If the retention data generation section 1407 determines that the corresponding error removal timing matches the cycle number of the corresponding index table 1501, the retention data generation section 1407 cancels the corresponding error connection (S2607). Specifically, the retention data generation section 1407 deletes the record of the corresponding connection ID in the error table, or sets the field for the connection ID of the corresponding record and the field for the error removal timing to be unset. Then, the process proceeds to the processing of S2609.

If the retention data generation section 1407 determines that the corresponding error removal timing does not match the cycle number of the corresponding index table 1501, packet collection is not ended yet, and thus, the process proceeds directly to the processing of S2609. Also, if the corresponding error removal timing is unset, the process proceeds directly to the processing S2609.

The retention data generation section 1407 determines whether or not there is an unprocessed error connection regarding S2605 (S2609). If the retention data generation section 1407 determines that there is an unprocessed error connection regarding S2605, the process returns to the processing of S2603 to repeat the above-described processing.

On the other hand, if the retention data generation section 1407 determines that there is not an unprocessed error connection regarding S2605, the retention data generation section 1407 ends the error connection cancelation processing and the process returns to the processing of S2219 illustrated in FIG. 22.

Thus, the retention data generation section 1407 collects packets stored in the packet buffer 115 at least up to the cycle in which error removal has been detected. For example, in the example illustrated in FIG. 13, for the connection (Connection ID: CN-0001) in which "loss increase" has occurred, the "loss increase" is removed in the tenth cycle and packets up to the tenth cycle are collected.

Returning to FIG. 22, the retention data generation section 1407 deletes the index table 1501 identified in S2203 (S2219). Then, the process returns to the processing of S2201 to repeat the above-described processing. The description of the processing of the storage processing section 127 is ended here.

According to this embodiment, a data retention amount used for retroactively analyzing an error connection is potentially reduced.

Furthermore, a packet captured before an error occurs is potentially retained. This is helpful, for example, in comprehending the state of a connection before an error occurs.

Also, a packet captured before an error is removed is potentially retained. This is helpful, for example, in comprehending the process of error removal in a connection.

Note that, since whether or not there is an error is not identified for each packet, a processing load is small.

Second Embodiment

In the above-described embodiment, an example in which packets relating to a predetermined error type are collected has been described but, in this embodiment, an example in which an error type for which packets are to be collected is determined in accordance with a storage state in the storage device 109 will be described.

Figure 27:
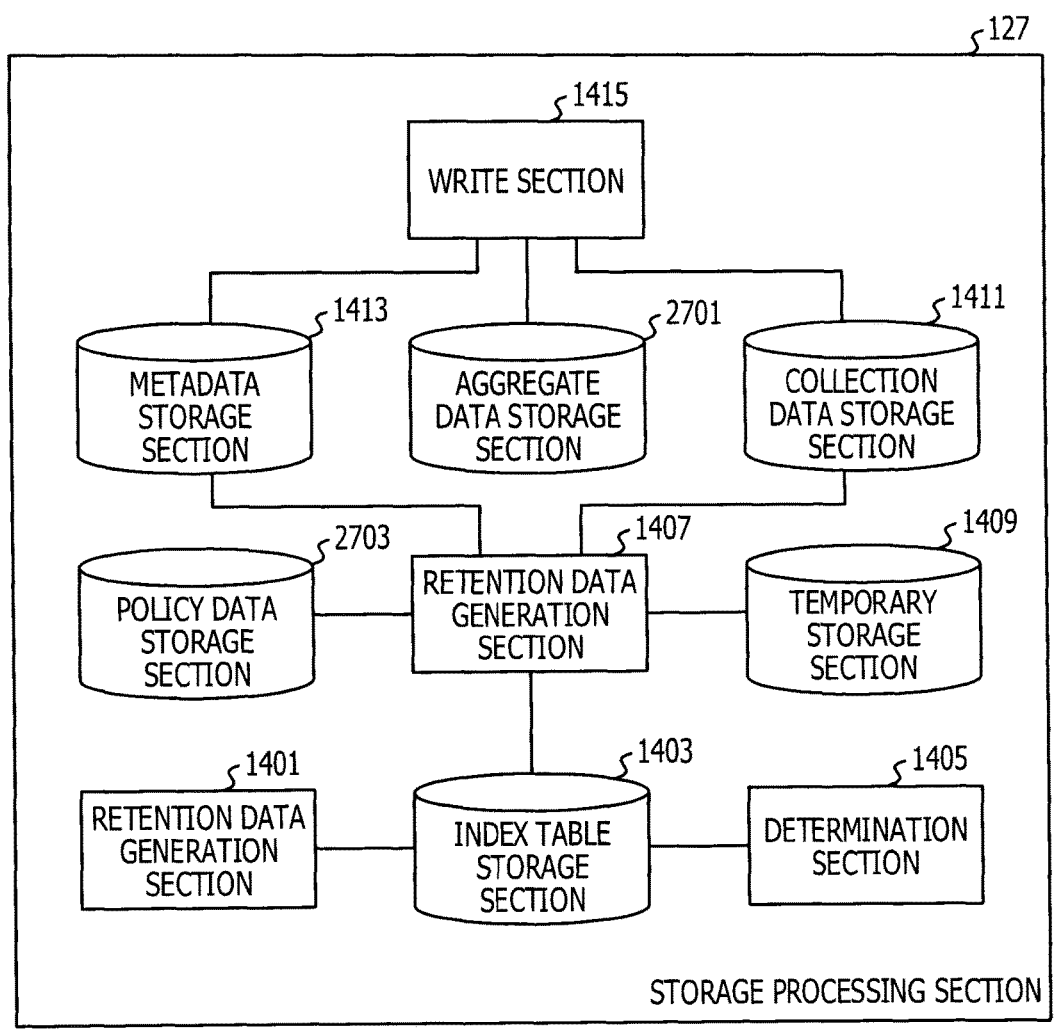
FIG. 27 is a diagram illustrating an example module configuration of a storage processing section according to a second embodiment.

FIG. 27 is a diagram illustrating an example module configuration of the storage processing section 127 according to a second embodiment. The storage processing section 127 according to this embodiment includes an aggregate data storage section 2701 and a policy data storage section 2703. The write section 1415 performs the processing of compiling data relating to the storage state of the storage device 109. The aggregate data storage section 2701 stores data compiled by the write section 1415. The policy data storage section 2703 stores data relating to a policy used for determining an error type in advance.

Aggregate data stored in the aggregate data storage section 2701 will be described. FIG. 28 is a table illustrating an example of the aggregate data. As for the aggregate data, a write amount (G byte), a write time (second), and a storage remaining amount (G byte) are associated with each record time.

The write amount (G byte) indicates the size of retention data written in a period from the previous record time to the corresponding record time.

The write time (second) indicates a processing time during which retention data was written in a period from the previous record time to the corresponding record time.

The storage remaining amount (G byte) indicates a remaining storage capacity at the corresponding record time.

In this example, the aggregate data is recorded at intervals of 30 seconds. This example indicates that retention data of 0.626 G bytes was written in period from time 09:59:30 to 10:00:00 and it took 6 seconds to write the retention data of 0.626 G bytes. This example also indicates that the remaining storage capacity was 6002 G bytes at time 10:00:00.

Furthermore, this example indicates that retention data of 2.534 G bytes was written in a period from time 10:00:00 to 10:00:30 and it took 24 seconds to write the retention data of 2.534 G bytes. This example also indicates that the remaining storage capacity was 5999 G bytes at time 10:00:30.

Furthermore, this example indicates that retention data of 1.245 G bytes was written in a period from time 10:00:30 to 10:01:00 and it took 12 seconds to write the retention data of 1.245 G bytes. This example also indicates that the remaining storage capacity was 5998 G bytes at time 10:01:00. The description of the aggregate data stored in the aggregate data storage section 2701 is ended here.

Figure 29:
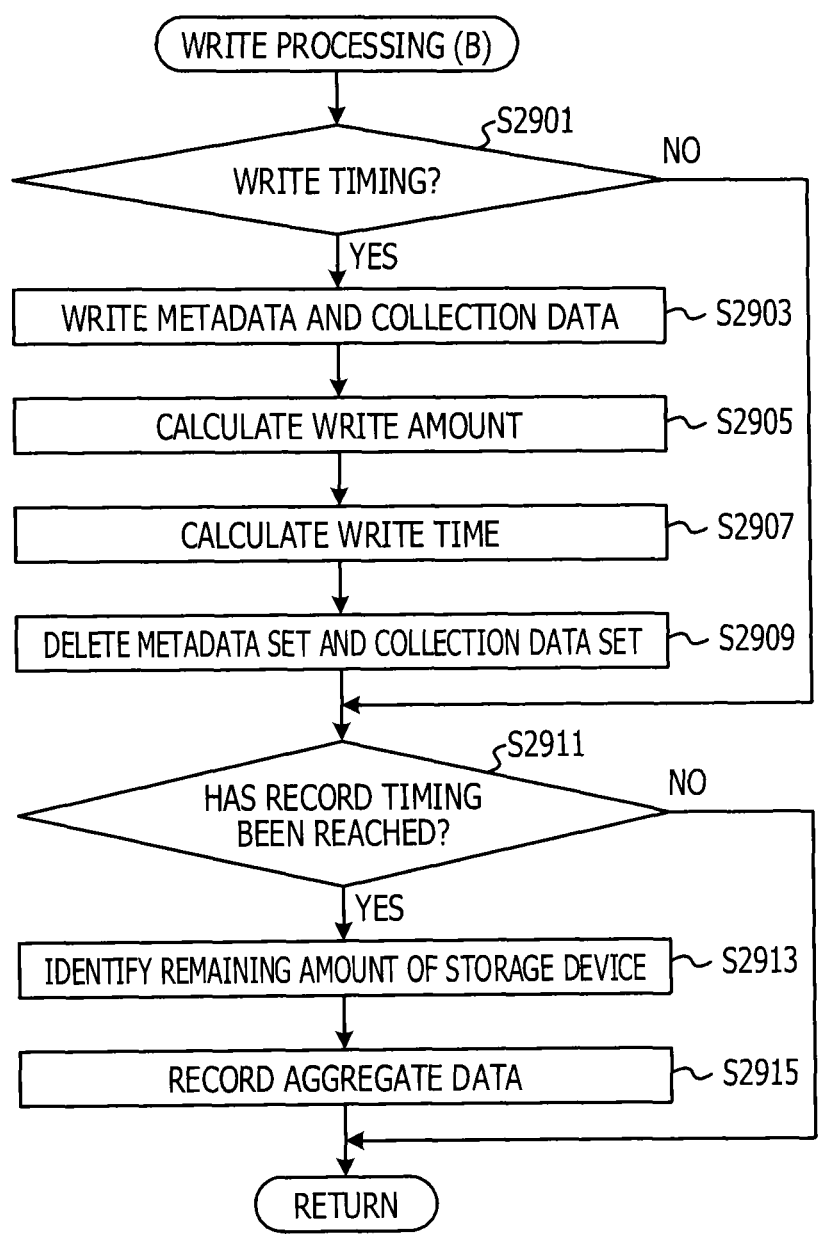
FIG. 29 is a flow chart illustrating a write processing (B) flow.

In this embodiment, instead of the write processing (A), write processing (B) is performed. FIG. 29 is a flow chart illustrating a write processing (B) flow. Similar to S2501 illustrated in FIG. 25, the write section 1415 determines whether or not a write timing has been reached (S2901).

If the write section 1415 determines that a write timing has been reached, similar to S2503 illustrated in FIG. 25, the write section 1415 writes metadata and correction data (S2903). The write section 1415 calculates the write amount to the storage device 109 in S2903 (S2905). Furthermore, the write section 1415 calculates the write time of data write to the storage device 109 in S2903 (S2907).

Then, similar to S2505 illustrated in FIG. 25, the write section 1415 deletes a metadata set and a collection data set (S2909). Then, the process proceeds to the processing of S2911.

On the other hand, if the write section 1415 determines that a write timing has not been reached, the process proceeds directly to the processing of S2911.

The write section 1415 determines whether or not a record timing has been reached (S2911). The write section 1415 records the aggregate data, for example, at predetermined intervals. The write section 1415 may be configured to determine, when the data amount stored in the collection data storage section 1411 and the metadata storage section 1413 has reached a predetermined amount, that a record timing has been reached.

If the write section 1415 determines that a record timing has been reached, the write section 1415 identifies the remaining amount of the storage device 109 (S2913). The write section 1415 obtains data indicating the remaining amount, for example, from the storage device 109. Then, the write section 1415 records the aggregate data in the aggregate data storage section 2701 (S2915) and ends the write processing (B). As described above with reference to FIG. 28, the write section 1415 associates the write amount (G byte), the write time (second), and the storage remaining amount (G byte) with each record time. The write amount in the aggregate data is a value obtained by totaling up the write amount calculated in S2905 in the corresponding period. The write time in the aggregate data is a value obtained by totaling the write time calculated in S2907 in the corresponding period.

On the other hand, if the write section 1415 determines that a record timing has not been reached, the write section 1415 directly ends the write processing (B). The description of the write processing (B) is ended here.

Figure 30:
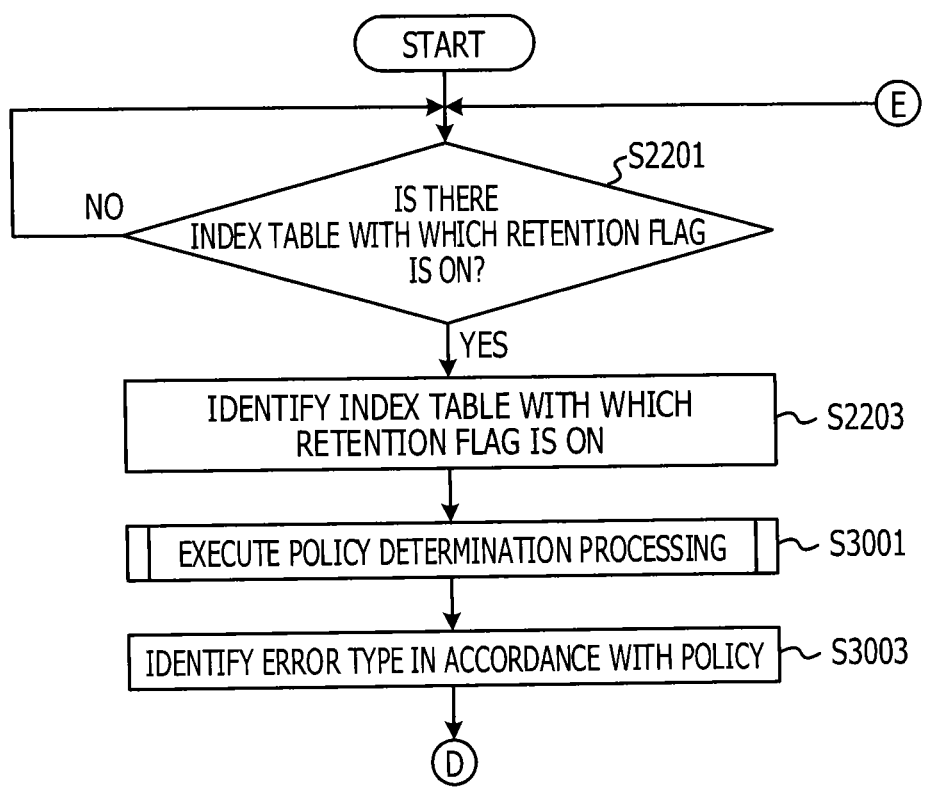
FIG. 30 is a flow chart illustrating a processing flow of the storage processing section according to the second embodiment.
Figure 31:
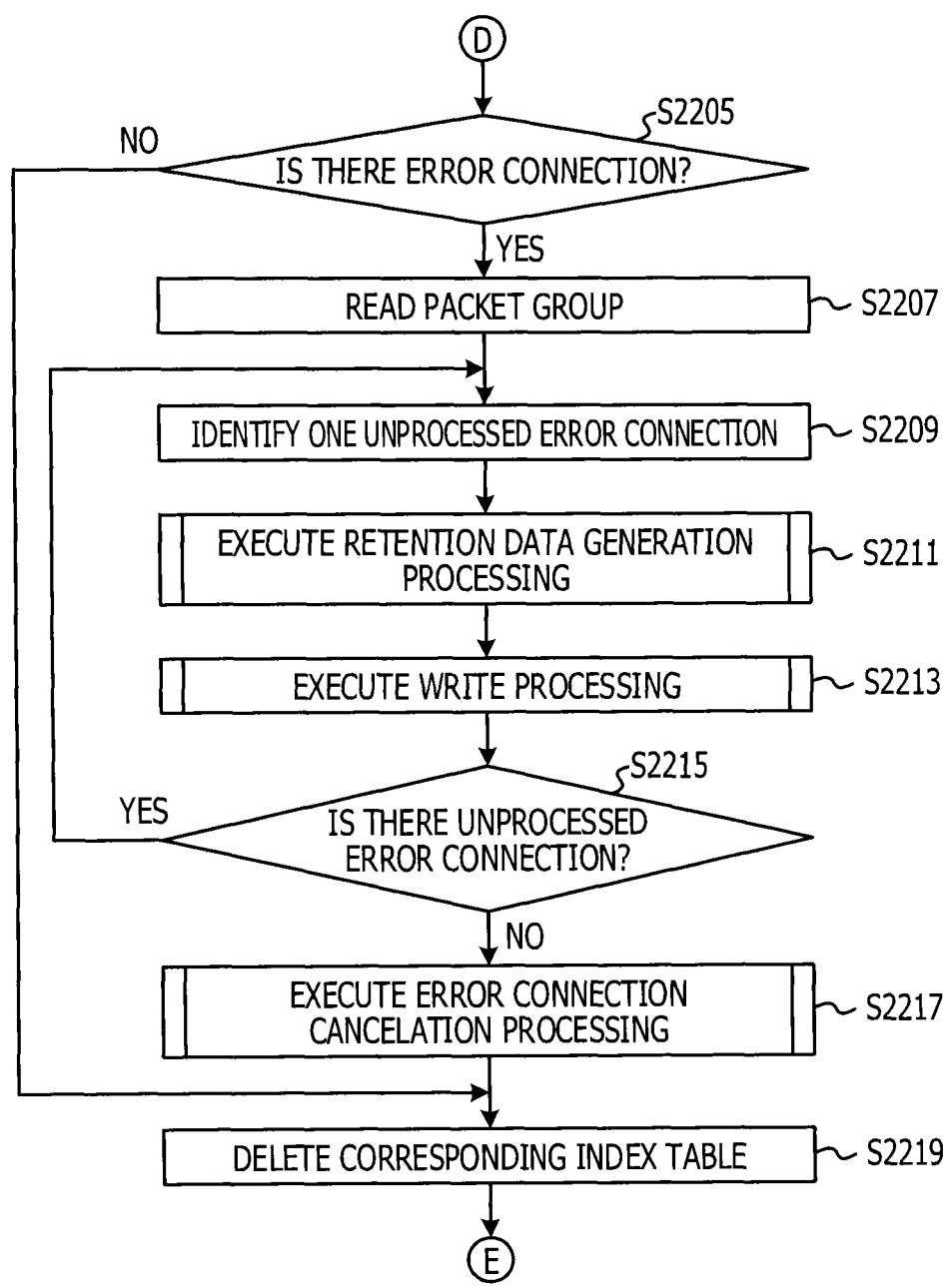
FIG. 31 is a flow chart illustrating a processing flow of the storage processing section according to the second embodiment.

In addition, in this embodiment, instead of the processing of the storage processing section 127 illustrated in FIG. 22 and FIG. 23, processing illustrated in FIG. 30 and FIG. 31 is performed. Each of FIG. 30 and FIG. 31 is a flow chart illustrating a processing flow of the storage processing section 127 according to the second embodiment. The processing in S2201 and S2203 is similar to that of FIG. 22. The retention data generation section 1407 executes policy determination processing (S3001).

Figure 32:
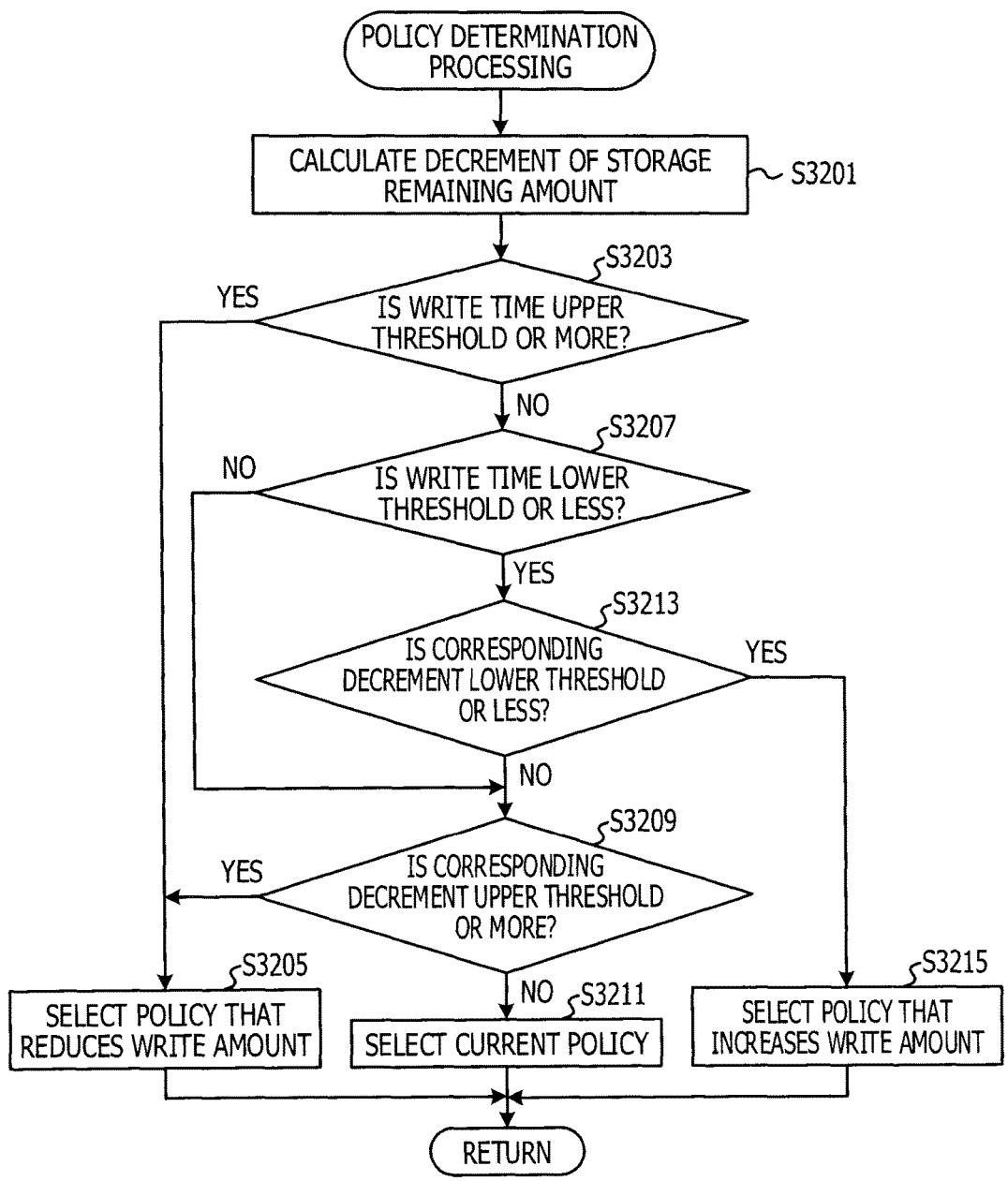
FIG. 32 is a flow chart illustrating a policy determination processing flow.

FIG. 32 is a flow chart illustrating a policy determination processing flow. In policy determination processing, a policy used for selecting an error type is determined based on the aggregation data stored in the aggregate data storage section 2701.

The retention data generation section 1407 deducts the latest storage remaining amount from the past storage remaining amount to thereby calculate a decrement of the storage remaining amount (S3201). The retention data generation section 1407 may be configured to calculate the simple average or the weighted average of decrements for a plurality of cycles.

The retention data generation section 1407 determines whether or not the latest write time is an upper threshold (for example, 28 seconds) or more (S3203). If the retention data generation section 1407 determines that the latest write time is the upper threshold or more, the retention data generation section 1407 selects a policy that reduces the write amount (S3205).

Policy data stored in the policy data storage section 2703 will be described below. FIG. 33 is a table illustrating an example of the policy data. The policy data defines the error type relating to a retention target in accordance with a policy.

In this example, a record is provided for each policy. In the record, data that identifies whether or not each error type is to be a retention target is set. In this example, a first record indicates that "loss increase", "RTT increase", and "server delay increase" relate to a retention target in a first policy. A second record indicates that "loss increase" and "RTT increase" relate to a retention target and "server delay target" does not relate to the retention target in a second policy. A third record indicates that "loss increase" relates to a retention target and "RTT increase" and "server delay increase" do not relate to the retention target in a third policy. In this example, the write amount is the largest in the first policy, the write amount is the second largest in the second policy, and the write amount is the smallest in the third policy.

In S3205 of FIG. 32, for example, in the example illustrated in FIG. 33, a lower-order policy than the current policy is selected.

Returning to the description of FIG. 32, if the retention data generation section 1407 determines that the latest write time is not the upper threshold or more in the processing of S3203, the retention data generation section 1407 determines whether or not the latest write time is a lower threshold (for example, 12 seconds) or less (S3207).

If the retention data generation section 1407 determines that the latest write time is not the lower threshold or less, the retention data generation section 1407 determines whether or not the decrement calculated in S3201 is an upper threshold (for example, 2.8 G bytes) or more (S3209).

If the retention data generation section 1407 determines that the decrement calculated in S3201 is the upper threshold or more, a policy that reduces the write amount is selected in S3205.

On the other hand, if the retention data generation section 1407 determines that the decrement calculated in S3201 is not the upper threshold or more, the retention data generation section 1407 selects the current policy (S3211). That is, the policy is not changed.

In S3207, if the retention data generation section 1407 determines that the latest write amount is the lower threshold or less in S3207, the retention data generation section 1407 determines whether or not the decrement calculated in S3201 is a lower threshold (for example, 1.1 G bytes) or less (S3213).

If the retention data generation section 1407 determines that the decrement calculated in S3201 is the lower threshold or less, the retention data generation section 1407 selects a policy that increases the write amount (S3215). In the example illustrated in FIG. 33, a higher-order policy than the current policy is selected.

On the other hand, if the retention data generation section 1407 determines that the decrement is not the lower threshold or less, the process proceeds to the processing of S3209 to perform the above-described processing. When the policy determination processing is ended, the process proceeds to the processing of S3003 illustrated in FIG. 30.

Returning to the description of FIG. 30, the retention data generation section 1407 identifies an error type in accordance with the policy determined in S3001 (S30003). Then, the process proceeds to S2205 illustrated in FIG. 31 via a terminal D.

In S2205, whether or not there is an error connection in the error table relating to the error type identified in S3003. Hereinafter, similarly, in S2207-S2217, an error connection in the error table relating to the error type identified in S3003 is a processing target.

S2219 is a similar to that in FIG. 22. When S2219 is ended, the process returns to the processing of S2201 illustrated in FIG. 30 via a terminal E.

Thus, selecting an error type such that, when it is presumed that the storage state in the storage device 109 is worsened, the write amount is reduced potentially reduces failures of data retention. Also, selecting an error type such that, when it is presumed that the storage state in the storage device 109 has been improved, the write amount is increased potentially enables analysis of many errors.

According to this embodiment, the data retention amount is potentially increased and reduced in accordance with the storage state of the storage section such as the storage device 109.

Third Embodiment

In the above-described embodiment, an example in which the ring buffer 301 is used in the index buffer 123 has been described, but in this embodiment, an example in which two buffer tables are used in the index buffer 123 will be described.

In this embodiment, a buffer table to which the index generation section 907 writes an index record is changed for each cycle. The retention data generation section 1407 reads an index record from one of the buffer tables in which an index record is not written. Therefore, the retention data generation section 1407 changes one buffer table to the other buffer table in synchronization with the index generation section 907 such that the buffer table from which the retention data generation section 1407 reads an index record is different from the buffer table to which the index generation section 907 writes an index record.

FIG. 34 is a diagram illustrating an example of an index buffer 123 according to a third embodiment. As illustrated in FIG. 34, the index buffer 123 includes two buffer tables 3401. Each of the buffer tables 3401 includes a header portion. In the header portion, a field used for setting a cycle number and a field used for setting the number of records are provided. The cycle number is a number that identifies the corresponding cycle. The cycle number is sequentially given. The number of records is the number of index records in the corresponding cycle.

The data main body of the ring buffer 3401 includes an index record for each packet. The index record has a similar configuration to that of the first embodiment.

This example indicates the intermediate state of a second cycle. The buffer table 3401a includes 100000 index records in a first cycle which has been already ended.

This example indicates that, in the first record, a connection relating to the packet to which the packet ID "PC-00000V" is allocated is identified by the connection ID "CN-0001".

Similarly, this example indicates that, in the second record, a connection relating to the packet to which the packet ID "PC-000002" is allocated is identified by the connection ID "CN-0002".

Similarly, this example indicates that, in the third record, a connection relating to the packet to which the packet ID "PC-000003" is allocated is identified by the connection ID "CN-0002".

Similarly, this example indicates that, in the fourth record, a connection relating to the packet to which the packet ID "PC-000004" is allocated is identified by the connection ID "CN-0003".

Similarly, this example indicates that, in the fifth record, a connection relating to the packet to which the packet ID "PC-000005" is allocated is identified by the connection ID "CN-0003".

Similarly, this example indicates that, in the sixth record, a connection relating to the packet to which the packet ID "PC-000006" is allocated is identified by the connection ID "CN-0001".

A buffer table 3401b includes three index records in the ongoing second cycle.

This example indicates that, in the first record, a connection relating to the packet to which the packet ID "PC-100001" is allocated is identified by the connection ID "CN-0003".

Similarly, this example indicates that, in the second record, a connection relating to the packet to which the packet ID "PC-100002" is allocated is identified by the connection ID "CN-0002".

Similarly, this example indicates that, in the third record, a connection relating to the packet to which the packet ID "PC-100003" is allocated is identified by the connection ID "CN-0004".

Note that, when the cycle proceeds to a third cycle, the cycle number of the buffer table 3401a is "3" and the number of records is zero. Thus, one of the buffer table 3401a and the buffer table 3401b is changed to the other for each cycle.

Figure 35:
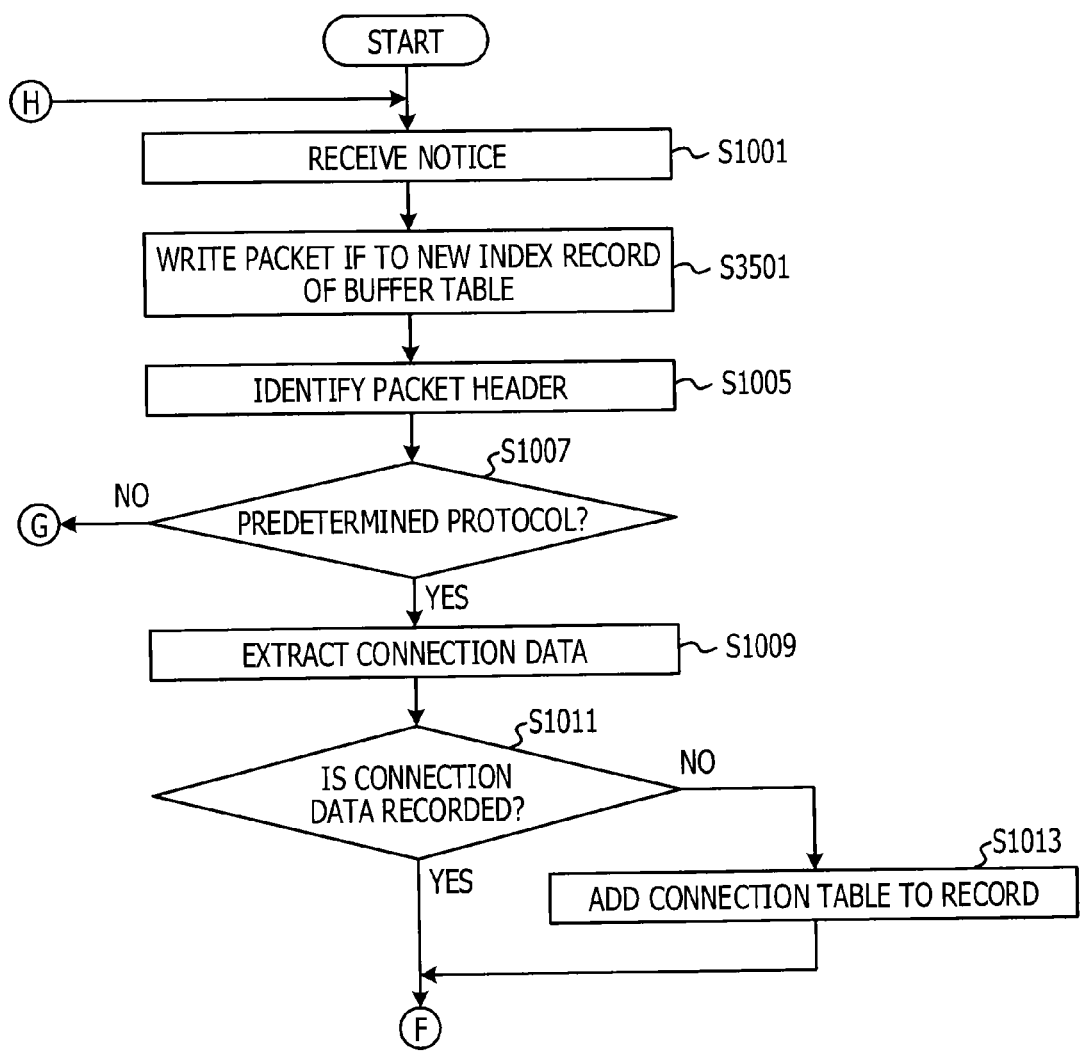
FIG. 35 is a flow chart illustrating a processing flow of an analysis section according to the third embodiment.
Figure 36:
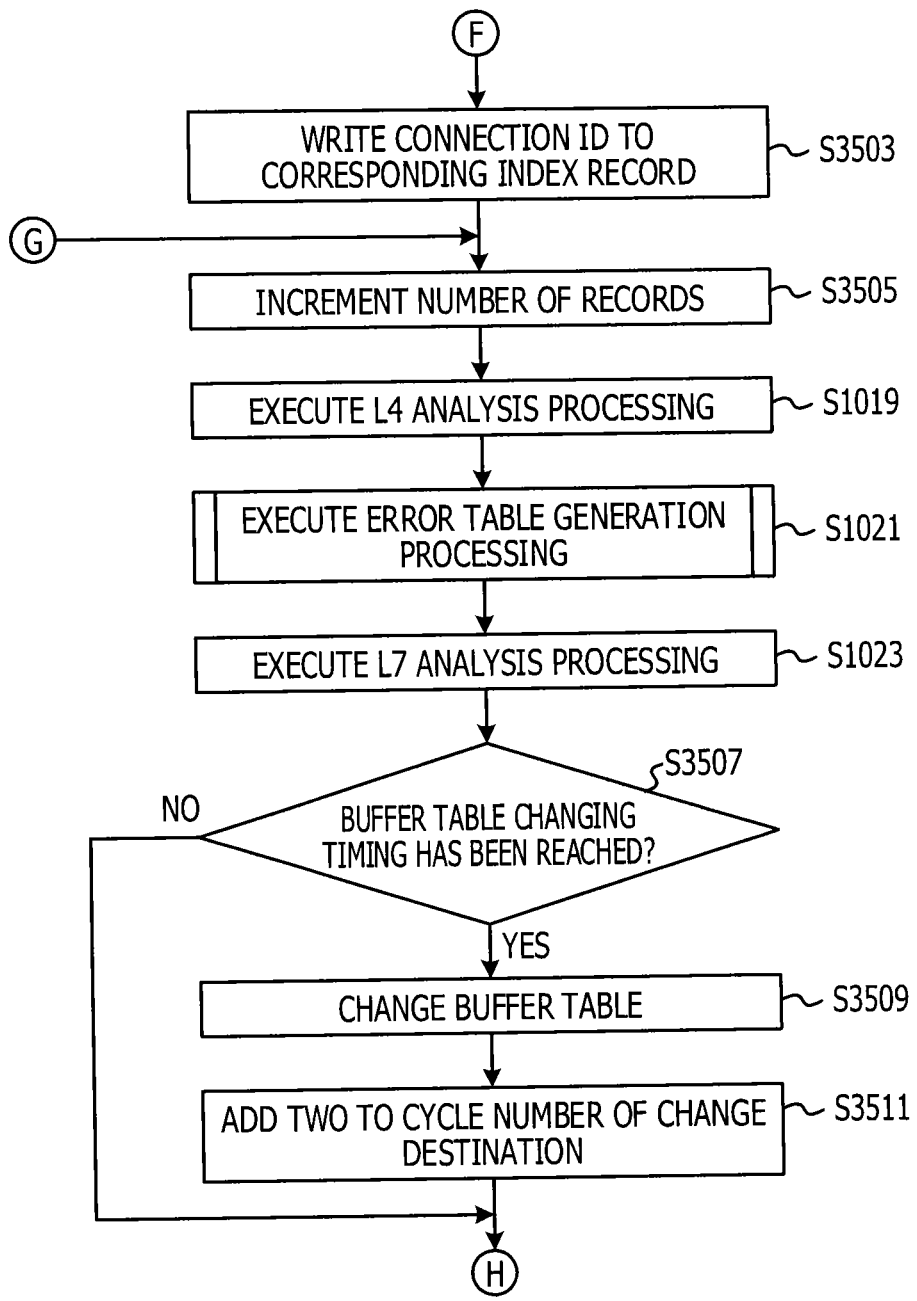
FIG. 36 is a flow chart illustrating a processing flow of the analysis section according to the third embodiment.

Also, in this embodiment, instead of the processing of the analysis section 117 illustrated in FIG. 10 and FIG. 11, processing illustrated in FIG. 35 and FIG. 36 is performed.

Each of FIG. 35 and FIG. 36 is a flow chart illustrating a processing flow of an analysis section 117 according to a third embodiment. The processing of S1001 is similar to that of FIG. 10.

The index generation section 907 writes a packet ID to a new index record of one of the buffer tables 3401 which serves as a write destination (S3501).

The processing of S1005-S1013 is similar to that of FIG. 10. Note that, if the L4 analysis section 131 determines that the protocol of the corresponding packet is not a predetermined protocol in S1007, the process proceeds to the processing of S3505 illustrated in FIG. 36 via a terminal G. The processing of S3505 will be described later. If the connection table generation section 905 determines that the connection data has been already registered in the connection table in S1011, or if the processing of S1013 is ended, the process proceeds to the processing of S3503 of FIG. 36 via a terminal F.

Moving to the processing of FIG. 36, the index generation section 907 writes a connection ID to the record to which the packet ID has been written in S3501 (S3503). Then, the index generation section 907 increments the number of records in one of the buffer tables 3401 which serves as a write destination (S3505).

The processing of S1019-S1023 is similar to that of FIG. 11.

The index generation section 907 determines whether or not the timing of changing one of the buffer tables 3401 to the other has been reached (S3507). In this example, similar to the case of FIG. 11, the index generation section 907 determines that the timing of changing one of the buffer tables 3401 to the other has been reached in accordance with a predetermined cycle. The index generation section 907 may be configured to determine, when the number of records has reached a predetermined value, that the timing of changing one of the buffer tables 3401 to the other has been reached.

If the index generation section 907 determines that the timing of changing one of the buffer tables 3401 to the other has been reached (S3509), the index generation section 907 adds two to the cycle number in one of the buffer tables 3401 which serves as a change destination (S3511). In this case, the index generation section 907 initializes the number of records to "0". Then, the process returns to the processing of S1001 illustrated in FIG. 35 via a terminal H.

On the other hand, if the index generation section 907 determines that the timing of changing one of the buffer tables 3401 to the other has not been reached, the process returns to the processing of S1001 illustrated in FIG. 35 via the terminal H. The description of the processing flow of the analysis section 117 is ended here.

Figure 37:
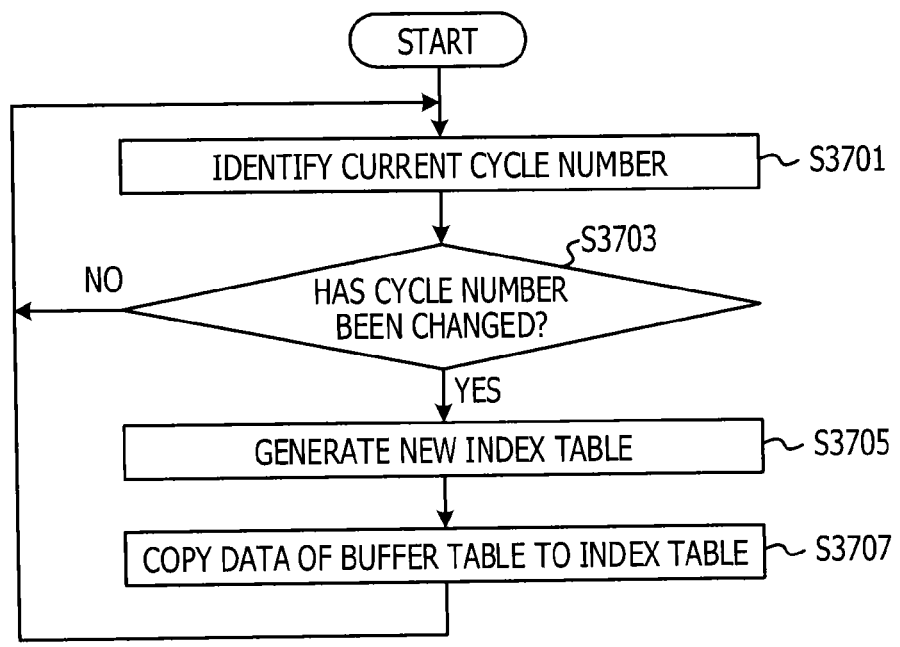
FIG. 37 is a flow chart illustrating a processing flow of a read section according to the third embodiment.

Also, in this embodiment, instead of the processing of the read section 1401 illustrated in FIG. 16, processing illustrated in FIG. 37 is performed.

The read section 1401 identifies the current cycle number (S3701). For example, the read section 1401 identifies the larger one of the cycle numbers set in the header portions of the two buffer tables 3401. As another alternative, the read section 1401 may be configured to obtain the current cycle number from the analysis section 117. Also, the read section 1401 may be configured to divide time elapsed since the generation of an index was started by time corresponding to one cycle and add one to the obtained quotient to thereby identify the current cycle number.

The read section 1401 determines whether or not the cycle number has been changed (S3703). Specifically, when the current cycle number identified in S3701 has increased by one from the prior cycle number, the read section 1401 determines that the cycle number has been changed.

If the read section 1401 determines that the cycle number has been changed, the read section 1401 generates a new index table 1501 (S3705) and copies data of one of the buffer tables 3401 to which data has not been written to the index table 1501 (S3707). Specifically, the read section 1401 copies the cycle number and the index records thereto. Then, the process returns to the processing of S3701.

If the read section 1401 determines that the cycle number has not been changed, the process returns to the processing of S3701.

Thus, when the buffer table is changed to the other one and then the other buffer table is used, for packets in the same cycle, the processing of generating retention data is delayed for a certain period of time, as compared to the processing of generating an index, and therefore, retention data is generated immediately at the time when an error is detected, so that a packet before the error has been occurred is collected.

According to this embodiment, when the index table 1501 is changed, an area in which the analysis section 117 writes an index record and an area from which the storage processing section 127 reads an index record are different from each other at any time, and parallel processing that utilizes a multicore is realized by complete lock-free algorithm. For example, even when storage of some of objects is delayed while waiting for the processing performed on the storage device 109, the influence on the entire processing is potentially reduced, and data is not lost until the processing is potentially restored.

Embodiments of the present disclosure have been described above, but the present disclosure is not limited thereto. For example, there are cases where the above-described functional block configuration does not match an actual program module configuration.

Also, the configuration of each of the storage areas that have been described above is merely an example, and a configuration other than the one described above may be used. Furthermore, as for the processing flows, as long as processing result are not changed, the order of processes may be changed. Furthermore, some of the processes may be performed in parallel.

Note that the network monitoring apparatus 101 described above is a computer apparatus and, as illustrated in FIG. 38, a memory 2501, a CPU 2503, a hard disc drive (HDD) 2505, a display control section 2507 coupled to a display device 2509, a drive device 2513 that drives a removable disk 2511, an input device 2515, and a communication control section 2517 that couples to a network are coupled to one another via a bus 2519. An operating system (OS) and application programs that cause the processing in each embodiment to be executed are stored in the HDD 2505 and, when being executed by the CPU 2503, the application programs are read from the HDD 2505 to the memory 2501. The CPU 2503 controls the display control section 2507, the communication control section 2517, and the drive device 2513 to cause them to perform predetermined operations. Data currently being processed is stored mainly in the memory 2501, but may be stored in the HDD 2505. In an embodiment of the present disclosure, an application program that causes the above-described processing to be executed is stored in the removable disk 2511 that is computer-readable to be distributed and is installed in the HDD 2505 from the drive device 2513. There are cases where the application program is installed in the HDD 2505 via a network, such as the Internet and the like, and the communication control section 2517. In such a computer device, a hardware, such as the above-described CPU 2503, the memory 2501, and the like, and a program, such as an application program and the like organically co-operate so that each of the above-described various functions is realized.

The above-described embodiments may be summarized as follows.

A packet retention method according to an embodiment includes the processing of allocating a first identifier to each of packets captured from a network and storing each of the packets in a buffer, the processing of associating a second identifier that identifies a connection of a packet relating to the corresponding first identifier with each of the first identifiers, the processing of detecting a connection in which an error has occurred by packet analysis, and the processing of identifying multiple ones of the first identifiers with which the second identifier of a connection in which an error has occurred is associated, collecting a packet to which each of the identified multiple ones of the first identifiers is allocated from the buffer, and storing the collected multiple packets in a storage section.

Thus, a data retention amount used for retroactively analyzing an error connection is potentially reduced.

In the above-described storage processing, a packet that is to be collected may be selected from packets stored in a buffer after time a predetermined period before a connection in which an error has occurred was detected.

Thus, a packet captured before an error occurs is potentially retained. This is helpful, for example, in comprehending the state of a connection before an error occurs.

The above-described packet retention method may further include the processing of detecting error removal. Also, in the above-described storage processing, a packet that is to be collected may be selected from packets stored in a buffer before error removal was detected.

Thus, a packet captured before an error is removed is potentially retained. This is helpful, for example, in comprehending the process of error removal in a connection.

The above-described packet retention method may further include the processing of identifying an error type in accordance with a storage state in a storage section.

Thus, a data retention amount is potentially increased and reduced in accordance with the storage state of the storage section.

Note that a program that causes a computer to execute the processing according to the above-described method is potentially produced, and the program may be stored in a computer-readable storage medium, such as, for example, a flexible disk, a CD-ROM, a magneto-optic disk, a semiconductor memory, a hard disk, and the like, or a storage device. Note that, in general, an intermediate processing result is temporarily retained in a storage device, such as a main memory and the like.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A packet storage method comprising:
  receiving a plurality of packets from a network including a plurality of connections;
  storing the plurality of packets in a buffer;
  identifying a relationship indicating which packet of the plurality of packets has been passed via which connection of the plurality of connections;
  executing an analysis of the plurality of packets stored in the buffer to detect at least one of an increase of round trip time (RTT) and an increase in server delay;
  specifying a first connection of the plurality of connections, in which at least one of the increase of the RTT and the increase in server delay has occurred, based on the analysis of the plurality of packets stored in the buffer;
  identifying, based on the relationship, a first packet of the plurality of packets, which has passed through the first connection and is stored in the buffer; and
  transferring from the buffer to a storage device, the first packet, among the plurality of received packets while deleting the plurality of packets stored in the buffer.

2. The packet storage method according to claim 1, further comprising:
  after receiving the plurality of packets, assigning, to each of the plurality of packets, a packet identifier that identifies the corresponding packet.

3. The packet storage method according to claim 2, wherein
  in identifying the relationship, a connection identifier that identifies a connection is associated with each of the packet identifiers.

4. The packet storage method according to claim 1, wherein
  the first packet that is to be stored in the storage device is selected from the plurality of packets received after a predetermined time before the connection in which the at least one of an increase of RTT and an increase in server delay has occurred was detected.

5. The packet storage method according to claim 1 further comprising:
  detecting that the at least one of an increase of RTT and an increase in server delay has been removed, wherein,
  from the plurality of packets received before time when the at least one of an increase of RTT and an increase in server delay is removed, the first packet that is to be stored in the storage device is selected.

6. The packet storage method according to claim 1 further comprising:
  selecting at least one type of the at least one of an increase of RTT and an increase in server delay from a plurality of types of the at least one of an increase of RTT and an increase in server delay in accordance with the remaining capacity of the storage device or time which it takes to write data included in the packet to the storage device.

7. An information processing apparatus comprising:
  a memory; and
  a processor coupled to the memory and configured to
    store the plurality of packets in a buffer;
      receive a plurality of packets from a network including a plurality of connections,
      identify a relationship indicating which packet of the plurality of packets has been passed via which connection of the plurality of connections,
      executing an analysis of the plurality of packets stored in the buffer to detect at least one of an increase of round trip time (RTT) and an increase in server delay;
      specify, based on the analysis of the plurality of packets stored in the buffer, a first connection of the plurality of connections, in which at least one of the increase of the RTT and the increase in server delay has occurred, identify, based on the relationship, a first packet of the plurality of packets which has passed through the first connection and is stored in the buffer, and transfer from the buffer to a storage device, the first packet, among the plurality of received packets while deleting the plurality of packets stored in the buffer.

8. The information processing apparatus according to claim 7, the processor is configured to, after receiving the plurality of packets, assign, to each of the plurality of packets, a packet identifier that identifies the corresponding packet.

9. The information processing apparatus according to claim 8, the processor is configured to, in identifying the relationship, associate a connection identifier that identifies a connection with each of the packet identifiers.

10. The information processing apparatus according to claim 7, wherein the first packet that is to be stored in the storage device is selected from the plurality of packets received after a predetermined time before the connection in which the at least one of an increase of RTT and an increase in server delay has occurred was detected.

11. The information processing apparatus according to claim 7, the processor is configured to detect that the at least one of an increase of RTT and an increase in server delay has been removed, wherein from the plurality of packets received before time when the at least one of an increase of RTT and an increase in server delay is removed, the first packet that is to be stored in the storage device is selected.

12. The information processing apparatus according to claim 7, the processor is configured to select at least one type of the at least one of an increase of RTT and an increase in server delay from a plurality of types of at least one of an increase of RTT and an increase in server delay in accordance with the remaining capacity of the storage device or time which it takes to write data included in the packet to the storage device.

13. A non-transitory computer-readable storage medium storing a program that causes an information processing apparatus to execute a process, the process comprising:

receiving a plurality of packets from a network including a plurality of connections;

storing the plurality of packets in a buffer;

identifying a relationship indicating which packet of the plurality of packets has been passed via which connection of the plurality of connections;

executing an analysis of the plurality of packets stored in the buffer to detect at least one of an increase of round trip time (RTT) and an increase in server delay;

specifying a first connection of the plurality of connections, in which at least one of the increase of the RTT and the increase in server delay has occurred, based on the analysis of the plurality of packets stored in the buffer;

identifying, based on the relationship, a first packet of the plurality of packets stored in the buffer which has passed through the first connection in which the error has occurred; and transferring from the buffer to a storage device, the first packet, among the plurality of received packets while deleting the plurality of packets stored in the buffer.

14. The non-transitory computer-readable storage medium according to claim 13, the process further comprising:

after receiving the plurality of packets, assigning, to each of the plurality of packets, a packet identifier that identifies the corresponding packet.

15. The non-transitory computer-readable storage medium according to claim 14, wherein in identifying the relationship, a connection identifier that identifies a connection is associated with each of the packet identifiers.

16. The non-transitory computer-readable storage medium according to claim 13, wherein the first packet that is to be stored in the storage device is selected from the plurality of packets received after a predetermined time before the connection in which the at least one of an increase of RTT and an increase in server delay has occurred was detected.

17. The non-transitory computer-readable storage medium according to claim 13, the process further comprising:

detecting that the at least one of an increase of RTT and increase in server delay has been removed, wherein, from the packets received before time when the at least one of an increase of RTT and increase in server delay is removed, the first packet that is to be stored in the storage device is selected.

18. The non-transitory computer-readable storage medium according to claim 13, the process further comprising:

selecting at least one type of the at least one of an increase of RTT and increase in server delay from a plurality of types of the at least one of an increase of RTT and increase in server delay in accordance with the remaining capacity of the storage device or time which it takes to write data included in the packet to the storage device.

19. The packet storage method according to claim 1, wherein the connection is defined based on at least one of source internet protocol (IP) address, source port number, destination IP address, destination port number, and protocol number.

20. A packet storage method comprising:

receiving a plurality of packets from a network including a plurality of connections;

storing the plurality of packets in a buffer;

identifying a relationship indicating which packet of the plurality of packets has been passed via which connection of the plurality of connections;

executing an analysis of the plurality of packets stored in the buffer to detect an increase of packet loss, an increase of round trip time (RTT) and an increase in server delay;

specifying a first connection of the plurality of connections, in which the increase of packet loss, the increase of the RTT and the increase in server delay has occurred, based on the analysis of the plurality of packets stored in the buffer;

identifying, based on the relationship, a first packet of the plurality of packets, which has passed through the first connection and is stored in the buffer; and transferring from the buffer to a storage device, the first packet, among the plurality of received packets while deleting the plurality of packets stored in the buffer.

* * * * *